US011924830B2

United States Patent
Qu et al.

(10) Patent No.: US 11,924,830 B2
(45) Date of Patent: Mar. 5, 2024

(54) COMMUNICATION METHOD AND COMMUNICATIONS APPARATUS

(71) Applicant: HUAWEI TECHNOLOGIES CO., LTD., Guangdong (CN)

(72) Inventors: Bingyu Qu, Beijing (CN); Jianguo Wang, Shanghai (CN); Yongxing Zhou, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 513 days.

(21) Appl. No.: 17/156,302

(22) Filed: Jan. 22, 2021

(65) Prior Publication Data

US 2021/0144693 A1 May 13, 2021

Related U.S. Application Data

(63) Continuation of application No. PCT/CN2019/097500, filed on Jul. 24, 2019.

(30) Foreign Application Priority Data

Jul. 24, 2018 (CN) .......................... 201810821618.2

(51) Int. Cl.
*H04W 72/04* (2023.01)
*H04L 1/00* (2006.01)
(Continued)

(52) U.S. Cl.
CPC .......... *H04W 72/20* (2023.01); *H04L 1/0061* (2013.01); *H04L 1/1896* (2013.01)

(58) Field of Classification Search
CPC ... H04W 28/04; H04W 72/04; H04W 72/042; H04W 88/08; H04W 72/20;
(Continued)

(56) References Cited

U.S. PATENT DOCUMENTS

2012/0051313 A1* 3/2012 Seo .................. H04W 72/21
370/329
2013/0010722 A1* 1/2013 Suzuki .................. H04W 72/04
370/329
(Continued)

FOREIGN PATENT DOCUMENTS

CN 102158326 A * 8/2011 ............ H04W 72/00
CN 102215586 A 10/2011
(Continued)

OTHER PUBLICATIONS

3GPP TSG RAN WG1 Meeting #90, Prague, Czechia, Aug. 21-25, 2017, R1-1712447, Source: ZTE, Title: NR-PDCCH for Supporting URLLC, Agenda item: 6.1.3.1.5. (Year: 2017).*
(Continued)

*Primary Examiner* — Peter G Solinsky
*Assistant Examiner* — Sanjay K Dewan
(74) *Attorney, Agent, or Firm* — WOMBLE BOND DICKINSON (US) LLP

(57) ABSTRACT

A network device sends a first physical channel to user equipment on resources of one or more candidate physical channels. Correspondingly, the user equipment monitors one or more candidate physical channels in a candidate physical channel set, to receive the first physical channel on the resources of the one or more candidate physical channels. A payload of the first physical channel includes control information and a transport block, the control information includes first information, the first information is used to indicate an acknowledgment resource to the user equipment, and the acknowledgment resource is a resource used by the user equipment to send acknowledgment information to the network device. After receiving the first physical channel, the user equipment sends the acknowledgment information to the network device on the acknowledgment resource; and
(Continued)

correspondingly, the network device receives the acknowledgment information on the acknowledgment resource.

20 Claims, 4 Drawing Sheets

(51) Int. Cl.
*H04L 1/18* (2023.01)
*H04W 72/20* (2023.01)
*H04L 1/1867* (2023.01)

(58) Field of Classification Search
CPC ............ H04W 72/0406; H04L 5/0007; H04L 1/0061; H04L 1/1896
USPC ........................................................ 370/329
See application file for complete search history.

(56) References Cited

U.S. PATENT DOCUMENTS

| | | | | |
|---|---|---|---|---|
| 2013/0028213 | A1* | 1/2013 | Ko | H04L 1/1607 370/329 |
| 2014/0071864 | A1* | 3/2014 | Seo | H04W 4/06 370/294 |
| 2015/0296491 | A1* | 10/2015 | Nam | H04L 5/0037 370/329 |
| 2015/0341956 | A1* | 11/2015 | Sun | H04L 1/0046 370/329 |
| 2016/0205669 | A1* | 7/2016 | Kusashima | H04W 72/23 370/280 |
| 2021/0377986 | A1* | 12/2021 | Awoniyi-Oteri | H04L 1/1896 |
| 2022/0131650 | A1* | 4/2022 | Chen | H04L 1/1896 |
| 2023/0163924 | A1* | 5/2023 | Lee | H04W 72/21 370/329 |

FOREIGN PATENT DOCUMENTS

| | | | | |
|---|---|---|---|---|
| CN | 102223215 A | * | 10/2011 | ............ H04W 72/00 |
| CN | 103179672 A | | 6/2013 | |
| CN | 104145525 A | | 11/2014 | |
| CN | 105493417 A | | 4/2016 | |
| CN | 107046715 A | | 8/2017 | |
| KR | 2 413 526 A2 | * | 2/2012 | ............ H04W 72/00 |
| WO | 2015018040 A1 | | 2/2015 | |
| WO | WO 2022/159836 A1 | * | 7/2022 | ............... H04L 1/18 |

OTHER PUBLICATIONS

ZTE, NR-PDCCH for supporting URLLC. 3GPP TSG RAN WG1 Meeting #90, Prague, Czechia, Aug. 21 25, 2017, R1-1712447, 7 pages.

Huawei, HiSilicon, DCI contents in NR and two-stage DCI designs . 3GPP TSG RAN WG1 Meeting #89, Hangzhou, China, May 15-19, 2017, R1-1706949, 6 pages.

3GPP TS 36.213 V15.2.0 (Jun. 2018); 3rd Generation Partnership Project; Technical Specification Group Radio Access Network; Evolved Universal Terrestrial Radio Access (E-UTRA); Physical layer procedures(Release 15);total 541 pages.

3GPP TS 36.331 V15.2.2 (Jun. 2018); 3rd Generation Partnership Project; Technical Specification Group Radio Access Network; Evolved Universal Terrestrial Radio Access (E-UTRA); Radio Resource Control (RRC);Protocol specification (Release 15);total 791 pages.

3GPP TS 38.214 V15.2.0 (Jun. 2018); 3rd Generation Partnership Project; Technical Specification Group Radio Access Network;NR;Physical layer procedures for data (Release 15);total 95 pages.

3GPP TS 38.321 V15.2.0 (Jun. 2018); 3rd Generation Partnership Project; Technical Specification Group Radio Access Network;NR;Medium Access Control (MAC) protocol specification(Release 15),total 73 pages.

3GPP TS 38.331 V15.2.1 (Jun. 2018); 3rd Generation Partnership Project; Technical Specification Group Radio Access Network;NR-;Radio Resource Control (RRC) protocol specification(Release 15);total 303 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2019/097500, filed on Jul. 24, 2019, which claims priority to Chinese Patent Application No. 201810821618.2, filed on Jul. 24, 2018. The disclosures of the aforementioned applications are hereby incorporated by reference in their entireties.

TECHNICAL FIELD

This application relates to communications technologies, and in particular, to a communication method and a communications apparatus.

BACKGROUND

In a long term evolution (LTE) system, a data transmission mechanism based on semi-persistent scheduling (SPS) is used for transmitting a physical downlink shared channel (PDSCH). In fifth-generation (5G) mobile communications technology new radio (NR), a similar transmission mechanism is used for transmitting a PDSCH.

Specifically, a network device periodically allocates resources to user equipment (UE) through a scrambled physical downlink control channel (PDCCH), and the resource is referred to as an SPS resource below. In each period, UE receives a PDSCH by using the SPS resource. In this way, the network device does not need to deliver the PDCCH to specify a resource for the UE each time before sending the PDSCH. In this process, a period of the SPS, a quantity of used processes, an acknowledgment resource, and the like are configured by using radio resource control (RRC) signaling. The acknowledgment resource is a resource used by the UE to feed back, to the network device, whether the PDSCH is correctly received. If the UE correctly receives the PDSCH, the UE sends an acknowledgment (ACK) to the network device on the acknowledgment resource. On the contrary, if the UE fails to correctly receive the PDSCH, the UE sends a negative acknowledgment (NACK) to the network device on the acknowledgment resource.

In the foregoing SPS-based data transmission mechanism, the network device needs to periodically configure the resources for sending the PDSCH. If the network device does not need to send the PDSCH in a period, a waste of resources is caused.

SUMMARY

This application provides a communication method and a communications apparatus, to avoid a waste of resources that is caused by periodically configuring resources for UE when a PDSCH is transmitted by using an SPS-based data transmission mechanism.

According to a first aspect, an embodiment of this application provides a communication method. The method may be used by a network device, or may be used by a chip in a network device. The following describes the method by using an example in which the method is used by a network device. The method includes: determining one or more candidate physical channels in a candidate physical channel set; sending a first physical channel to user equipment on resources of the one or more candidate physical channels, where a payload of the first physical channel includes control information and a transport block, the control information includes first information, the first information is used to indicate an acknowledgment resource to the user equipment, and the acknowledgment resource is a resource used by the user equipment to send acknowledgment information to the network device; and receiving, on the acknowledgment resource, the acknowledgment information sent by the user equipment.

According to the method provided in the first aspect, the network device does not need to periodically configure, for the user equipment, resources for sending the first physical channel, thereby avoiding a waste of resources. Moreover, the transport block included in the payload of the first physical channel may be a transport block of any service type. Therefore, a requirement of a burst high-reliable and low-latency URLLC service can be met. In addition, the network device may flexibly specify, based on a service type of the transport block in the payload of the first physical channel and by using the first information in the control information included in the payload of the first physical channel, the acknowledgment resource for carrying the acknowledgment information.

In one embodiment, the payload of the first physical channel further includes cyclic redundancy check CRC information of the control information and the transport block.

According to the communication method provided in the possible implementation, the network device may flexibly include the CRC check information in the payload, and send the payload to the user equipment through the first physical channel, to flexibly send the CRC information.

In one embodiment, the acknowledgment information is used to indicate that the user equipment correctly receives the payload; or the acknowledgment information is used to indicate that the user equipment correctly receives the transport block.

According to the communication method provided in the possible implementation, the network device sends the first physical channel to the user equipment, where the first physical channel includes the transport block and the control information, the control information includes the first information that indicates the acknowledgment resource, and the transport block and the first information may be jointly used to generate additional CRC. When correctly receiving the payload or the transport block, the user equipment sends the acknowledgment information on the acknowledgment resource that is indicated by the first information. The network device may flexibly specify a location of the acknowledgment resource by using the first information, so that different latency requirements for data sending can be met based on different service types, thereby improving flexibility of a data transmission latency of a system. Particularly, when the network device does not send the first physical channel, the user equipment does not need to send the acknowledgment information, thereby improving flexibility of sending the first physical channel by the network device.

In one embodiment, the determining one or more candidate physical channels in a candidate physical channel set includes: determining the one or more candidate physical channels based on a configuration of the candidate physical channel set, where the configuration of the candidate physical channel set includes one or more sizes of the one or more candidate physical channels in the candidate physical channel set and a quantity of the candidate physical channels in the candidate physical channel set.

According to the communication method provided in the possible implementation, the network device determines the one or more candidate physical channels based on the configuration of the candidate physical channel set. The configuration of the candidate physical channel set includes the one or more sizes of the one or more candidate physical channels and the quantity of the candidate physical channels. In a specific implementation process, the network device may flexibly select the sizes of the candidate physical channels based on a channel condition of the user equipment and requirements on reliability and a latency of data transmission; select the one or more candidate physical channels from the candidate physical channel set; and send the first physical channel on resources of the one or more selected candidate physical channels, thereby implementing link self-adaptation, improving transmission reliability, and meeting a sending latency requirement.

In one embodiment, the determining the one or more candidate physical channels based on a configuration of the candidate physical channel set includes: determining the one or more candidate physical channels based on a format of the payload and the configuration of the candidate physical channel set, where the format of the payload is predefined or configured by a higher layer.

According to the communication method provided in the possible implementation, the network device determines the one or more candidate physical channels in the candidate physical channel set based on the format of the payload (or the transport block) of the first physical channel and the configuration of the candidate physical channel set, and sends the first physical channel on the resources of the one or more candidate physical channels. In this process, the network device may flexibly select formats of different payloads (or transport blocks) based on different service requirements, and select the candidate physical channel based on a channel condition of the user equipment and requirements on reliability and a latency of data transmission, thereby improving transmission reliability and meeting a sending latency requirement. When the user equipment detects a plurality of candidate physical channels in the candidate physical channel set, a format of an optional payload is used, so that a quantity of times of blind detection can be reduced, thereby reducing a latency of sending the acknowledgment information by the user equipment, and reducing complexity of blind detection.

In one embodiment, the control information further includes: an identifier of a process used for sending the transport block, and/or power control information of an uplink physical channel of the user equipment.

According to the communication method provided in the possible implementation, the control information of the first physical channel further includes the identifier of the process for sending the transport block. The network device receives acknowledgment information corresponding to the identifier of the process, and may enable a plurality of processes to transmit the transport block within a loopback time of data transmission, so that transmission efficiency is improved. In addition, reliability of transmission of the transport block can be improved by using a same process to retransmit the transport block. Further, the network device may flexibly configure a total quantity of processes, that is, a total quantity of identifiers of processes, to meet different latency requirements in different loopback time of the data transmission.

In one embodiment, the determining one or more candidate physical channels in a candidate physical channel set includes: obtaining the one or more candidate physical channels from the candidate physical channel set based on repetition quantity configuration information of the first physical channel, where the plurality of candidate physical channels form a candidate physical channel combination, at least two candidate physical channels in the candidate physical channel combination occupy different time units, the repetition quantity configuration information of the first physical channel indicates a set of repetition quantities of the first physical channel, payloads of all the candidate physical channels in the candidate physical channel combination are the same, and a configuration of the candidate physical channel combination is predefined or configured by a higher layer.

According to the communication method provided in the possible implementation, the network device sends the first physical channel on the plurality of candidate physical channels based on the repetition quantity configuration information of the first physical channel, so that transmission reliability can be further improved. In addition, the set of repetition quantities is indicated by using the repetition quantity configuration information, and the set of repetition quantities includes a plurality of optional repetition quantity values, so that the network device can flexibly select a repetition quantity based on a channel condition of the user equipment. If the repetition quantity is increased, transmission reliability can be improved; or if the repetition quantity is reduced, a data transmission latency can be reduced. Therefore, a compromise can be made between the reliability and the latency, thereby flexibly adapting to flexibility of data transmission.

In one embodiment, the control information further includes second information, the second information indicates a repetition quantity value of the first physical channel, where the repetition quantity value belongs to the set of repetition quantities indicated by the repetition quantity configuration information of the first physical channel.

According to the communication method provided in the possible implementation, the control information of the first physical channel further includes the repetition quantity value of the first physical channel, where the repetition quantity value belongs to the set of repetition quantities indicated by the repetition quantity configuration information. After learning of the repetition quantity value, the user equipment may accurately obtain an end moment for sending the first physical channel, and may accurately learn of timing of the first physical channel and the acknowledgment resource (channel), to quickly feed back the acknowledgment information.

In one embodiment, the foregoing method further includes: sending first configuration information to the user equipment, where the first configuration information is used to indicate the user equipment to monitor the one or more candidate physical channels in the candidate physical channel set; and/or sending second configuration information to the user equipment, where the second configuration information is used to indicate the user equipment to detect a second physical channel, a payload of the second physical channel includes a transport block, and an acknowledgment resource corresponding to the second physical channel is notified by using higher layer signaling or downlink control information.

According to the communication method provided in the possible implementation, the network device may choose, based on an actual service status, to deliver the first configuration information and/or the second configuration information to the user equipment, to flexibly meet requirements of different services on performance such as a throughput, reliability, and a latency. Particularly, when both the first configuration information and the second configuration information are configured, the acknowledgment resource corresponding to the second configuration information is notified by using the higher layer signaling or the downlink control information, and the user equipment always sends an ACK or a NACK on the acknowledgment resource, so that the network device measures a channel by using a sent signal, to help improve sending and receiving performance of the channel configured by using the first configuration information.

According to a second aspect, an embodiment of this application provides a communication method. The method may be used by user equipment, or may be used by a chip in user equipment. The following describes the method by using an example in which the method is used by user equipment. The method includes: monitoring one or more candidate physical channels in a candidate physical channel set, to receive, on resources of the one or more candidate physical channels, a first physical channel sent by a network device, where a payload of the first physical channel includes control information and a transport block, the control information includes first information, the first information is used to indicate an acknowledgment resource to the user equipment, and the acknowledgment resource is a resource used by the user equipment to send acknowledgment information to the network device; and sending the acknowledgment information to the network device on the acknowledgment resource.

According to the method provided in the second aspect, the network device does not need to periodically configure, for the user equipment, resources for sending the first physical channel, and correspondingly, the user equipment does not need to periodically monitor the first physical channel, thereby avoiding a waste of resources. Moreover, the transport block included in the payload of the first physical channel may be a transport block of any service type. Therefore, a requirement of a burst high-reliable and low-latency URLLC service can be met. In addition, the network device may flexibly specify, based on a service type of the transport block in the payload of the first physical channel and by using the first information in the control information included in the payload of the first physical channel, the acknowledgment resource for carrying the acknowledgment information.

In one embodiment, the payload of the first physical channel further includes cyclic redundancy check CRC information of the control information and the transport block.

According to the communication method provided in the possible implementation, the first physical channel received by the user equipment includes the CRC check information, and the network device may flexibly include the CRC check information in the payload, and send the payload to the user equipment through the first physical channel, to flexibly send and receive the CRC information.

In one embodiment, the acknowledgment information is used to indicate, to the network device, that the user equipment correctly receives the payload; or the acknowledgment information is used to indicate, to the network device, that the user equipment correctly receives the transport block.

According to the communication method provided in the possible implementation, the network device sends the first physical channel to the user equipment, where the first physical channel includes the transport block and the control information, the control information includes the first information that indicates the acknowledgment resource, and the transport block and the first information may be jointly used to generate additional CRC. When correctly receiving the payload or the transport block, the user equipment sends the acknowledgment information on the acknowledgment resource that is indicated by the first information. The network device may flexibly specify a location of the acknowledgment resource by using the first information, so that different latency requirements for data sending can be met based on different service types, thereby improving flexibility of a data transmission latency of a system. Particularly, when the network device does not send the first physical channel, the user equipment does not need to send the acknowledgment information, thereby improving flexibility of sending the first physical channel by the network device.

In one embodiment, the monitoring one or more candidate physical channels in a candidate physical channel set, to receive a first physical channel sent by a network device includes: monitoring the one or more candidate physical channels in the candidate physical channel set based on a configuration of the candidate physical channel set, to receive the first physical channel sent by the network device, where the configuration of the candidate physical channel set includes one or more sizes of the one or more candidate physical channels in the candidate physical channel set and a quantity of the candidate physical channels in the candidate physical channel set.

According to the communication method provided in the possible implementation, the network device may flexibly select the one or more sizes of the candidate physical channels based on a channel condition of the user equipment and requirements on reliability and a latency of data transmission; select the one or more candidate physical channels from the candidate physical channel set; and send the first physical channel on resources of the one or more selected candidate physical channels. Correspondingly, the user equipment receives the first physical channel on the resources of the one or more candidate physical channels, thereby implementing link self-adaptation, improving transmission reliability, and meeting a sending latency requirement.

In one embodiment, the monitoring the one or more candidate physical channels based on a configuration of the candidate physical channel set includes: monitoring the one or more candidate physical channels based on a format of the payload and the configuration of the candidate physical channel set, where the format of the payload is predefined or configured by a higher layer.

According to the communication method provided in the possible implementation, the network device determines the one or more candidate physical channels in the candidate physical channel set based on the format of the payload (or the transport block) of the first physical channel and the configuration of the candidate physical channel set, and sends the first physical channel on the resources of the one or more candidate physical channels. In this process, the network device may flexibly select formats of different payloads (or transport blocks) based on different service requirements, and select the candidate physical channel based on a channel condition of the user equipment and requirements on reliability and a latency of data transmission, thereby improving transmission reliability and meeting a sending latency requirement. When the user equipment detects a plurality of candidate physical channels in the candidate physical channel set, a format of an optional payload is used, so that a quantity of times of blind detection can be reduced, thereby reducing a latency of sending the acknowledgment information by the user equipment, and reducing complexity of blind detection.

In one embodiment, the control information further includes: an identifier of a process used for receiving the transport block, and/or power control information of an uplink physical channel of the user equipment.

According to the communication method provided in the possible implementation, the control information of the first physical channel further includes the identifier of the process for sending the transport block. The user equipment sends acknowledgment information corresponding to the identifier of the process, and the network device receives the acknowledgment information corresponding to the identifier of the process, and may enable a plurality of processes to transmit the transport block within a loopback time of data transmission, so that transmission efficiency is improved. In addition, reliability of transmission of the transport block can be improved by using a same process to retransmit the transport block. Further, the network device may flexibly configure a total quantity of processes, that is, a total quantity of identifiers of processes, to meet different latency requirements in different loopback time of the data transmission.

In one embodiment, the monitoring one or more candidate physical channels in a candidate physical channel set, to receive a first physical channel sent by a network device includes: monitoring, in at least two different time units based on repetition quantity configuration information of the first physical channel, a candidate physical channel combination in the candidate physical channel set, to receive the first physical channel sent by the network device, where the repetition quantity configuration information of the first physical channel indicates a set of repetition quantities of the first physical channel, payloads of all the candidate physical channels in the candidate physical channel combination are the same, at least two candidate physical channels in the candidate physical channel combination occupy different time units, and a configuration of the candidate physical channel combination is predefined or configured by a higher layer.

According to the communication method provided in the possible implementation, the network device sends the first physical channel on the plurality of candidate physical channels based on the repetition quantity configuration information of the first physical channel, so that transmission reliability can be further improved. In addition, the set of repetition quantities is indicated by using the repetition quantity configuration information, and the set of repetition quantities includes a plurality of optional repetition quantity values, so that the network device can flexibly select a repetition quantity based on a channel condition of the user equipment. If the repetition quantity is increased, transmission reliability can be improved; or if the repetition quantity is reduced, a transmission latency of a data block can be reduced. Therefore, a compromise can be made between the reliability and the latency, thereby flexibly adapting to flexibility of data transmission.

In one embodiment, the control information further includes second information, the second information indicates a repetition quantity value of the first physical channel, where the repetition quantity value belongs to the set of repetition quantities indicated by the repetition quantity configuration information of the first physical channel.

According to the communication method provided in the possible implementation, the control information of the first physical channel further includes the repetition quantity value of the first physical channel, where the repetition quantity value belongs to the set of repetition quantities indicated by the repetition quantity configuration information. After learning of the repetition quantity value, the user equipment may accurately obtain an end moment for sending the first physical channel, and may accurately learn of timing of the first physical channel and the acknowledgment resource (channel), to quickly feed back the acknowledgment information.

In one embodiment, the foregoing method further includes: receiving first configuration information sent by the network device, and monitoring the one or more candidate physical channels in the candidate physical channel set based on the first configuration information; and/or receiving second configuration information sent by the network device, and detecting a second physical channel based on the second configuration information, where a payload of the second physical channel includes a transport block, and an acknowledgment resource corresponding to the second physical channel is notified by using higher layer signaling or downlink control information.

According to the communication method provided in the possible implementation, the network device may choose, based on an actual service status, to deliver the first configuration information and/or the second configuration information to the user equipment, to flexibly meet requirements of different services on performance such as a throughput, reliability, and a latency. Particularly, when both the first configuration information and the second configuration information are configured, the acknowledgment resource corresponding to the second configuration information is notified by using the higher layer signaling or the downlink control information, and the user equipment always sends an ACK or a NACK on the acknowledgment resource, so that the network device measures a channel by using a sent signal, to help improve sending and receiving performance of the channel configured by using the first configuration information.

According to a third aspect, an embodiment of this application provides a communications apparatus. The communications apparatus may be a network device, or may be a chip in a network device. The communications apparatus may include a processing unit and a transceiver unit. When the apparatus is the network device, the processing unit may be a processor, and the transceiver unit may be a transceiver. The network device may further include a storage unit, and the storage unit may be a memory. The storage unit is configured to store an instruction, and the processing unit executes the instruction stored in the storage unit, so that the network device performs the communication method according to the first aspect or the possible implementations of the first aspect. When the apparatus is the chip in the network device, the processing unit may be a processor, and the transceiver unit may be an input/output interface, a pin, a circuit, or the like. The processing unit executes an instruction stored in a storage unit, so that the network device performs the communication method according to the first aspect or the possible implementations of the first aspect. The storage unit may be a storage unit (for example, a register or a cache) in the chip, or may be a storage unit (for example, a read-only memory or a random access memory) that is in the network device and that is located outside the chip.

According to a fourth aspect, an embodiment of this application provides a communications apparatus. The communications apparatus may be a terminal device, or may be a chip in a terminal device. The apparatus may include a processing unit and a transceiver unit. When the apparatus is the terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs the communication method according to the second aspect or the possible implementations of the second aspect. When the apparatus is the chip in the terminal device, the processing unit may be a processor, and the transceiver unit may be an input/output interface, a pin, a circuit, or the like. The processing unit executes an instruction stored in a storage unit, so that the terminal device performs the communication method according to the second aspect or the possible implementations of the second aspect. The storage unit may be a storage unit (for example, a register or a cache) in the chip, or may be a storage unit (for example, a read-only memory or a random access memory) that is in the terminal device and that is located outside the chip.

According to a fifth aspect, an embodiment of this application provides a computer program product including an instruction. When the computer program product runs on a computer, the computer is enabled to perform the method according to the first aspect or the possible implementations of the first aspect.

According to a sixth aspect, an embodiment of this application provides a computer program product including an instruction. When the computer program product runs on a computer, the computer is enabled to perform the method according to the second aspect or the possible implementations of the second aspect.

According to a seventh aspect, an embodiment of this application provides a computer-readable storage medium. The computer-readable storage medium stores an instruction, and when the instruction is run on a computer, the computer is enabled to perform the method according to the first aspect or the possible implementations of the first aspect.

According to an eighth aspect, an embodiment of this application provides a computer-readable storage medium. The computer-readable storage medium stores an instruction, and when the instruction is run on a computer, the computer is enabled to perform the method according to the second aspect or the possible implementations of the second aspect.

According to the communication method and the communications apparatus provided in the embodiments of this application, the network device sends the first physical channel to the user equipment on the resources of the one or more candidate physical channels. Correspondingly, the user equipment monitors the one or more candidate physical channels in the candidate physical channel set, to receive the first physical channel on the resources of the one or more candidate physical channels. The payload of the first physical channel includes the control information and the transport block, the control information includes the first information, the first information is used to indicate the acknowledgment resource to the user equipment, and the acknowledgment resource is a resource used by the user equipment to send the acknowledgment information to the network device. After receiving the first physical channel, the user equipment sends the acknowledgment information to the network device on the acknowledgment resource; and correspondingly, the network device receives the acknowledgment information on the acknowledgment resource. In this process, the network device does not need to periodically configure, for the user equipment, the resources for sending the first physical channel, thereby avoiding a waste of resources. Moreover, the transport block included in the payload of the first physical channel may be a transport block of any service type. Therefore, a requirement of a burst high-reliable and low-latency URLLC service can be met. In addition, the network device may flexibly specify, based on the service type of the transport block in the payload of the first physical channel and by using the first information in the control information included in the payload of the first physical channel, the acknowledgment resource for carrying the acknowledgment information.

DESCRIPTION OF EMBODIMENTS

The communication method described in this application may be used in various communications systems, for example, a wireless fidelity (Wi-Fi) system, a worldwide interoperability for microwave access (WiMAX) system, a global system for mobile communications (GSM) system, a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single carrier FDMA (SC-FDMA) system, a general packet radio service (GPRS) system, a 3rd generation (3G) mobile communication system, a long term evolution (LTE) system, a long term evolution advanced (LTE-A) system, a cellular system related to the 3rd Generation Partnership Project (3GPP), a 5th generation (5G) mobile communication system, and another such communications system.

The user equipment (UE) in the embodiments of this application is a device that provides voice and/or data connectivity to a user, for example, a handheld device or a vehicle-mounted device with a wireless connection function. The common user equipment includes a mobile phone, a tablet computer, a notebook computer, a palmtop computer, a mobile internet device (MID), or a wearable device such as a smartwatch, a smart band, or a pedometer.

The network device in the embodiments of this application may be a common base station (for example, a NodeB, an eNB, or a gNB), a new radio (NR) controller, a centralized network element (centralized unit), a new radio base station, a radio remote unit, a micro base station, a relay, a distributed unit, a receiver point (transmission reception point (TRP)), a transmission point (TP), or any other device. However, this is not limited in the embodiments of this application.

For ease of description and clarity, the following describes in detail an architecture of the communications system in this application by using an example in which the architecture of the communications system is specifically a 5G system. For details, refer to FIG. 1.

Figure 1:
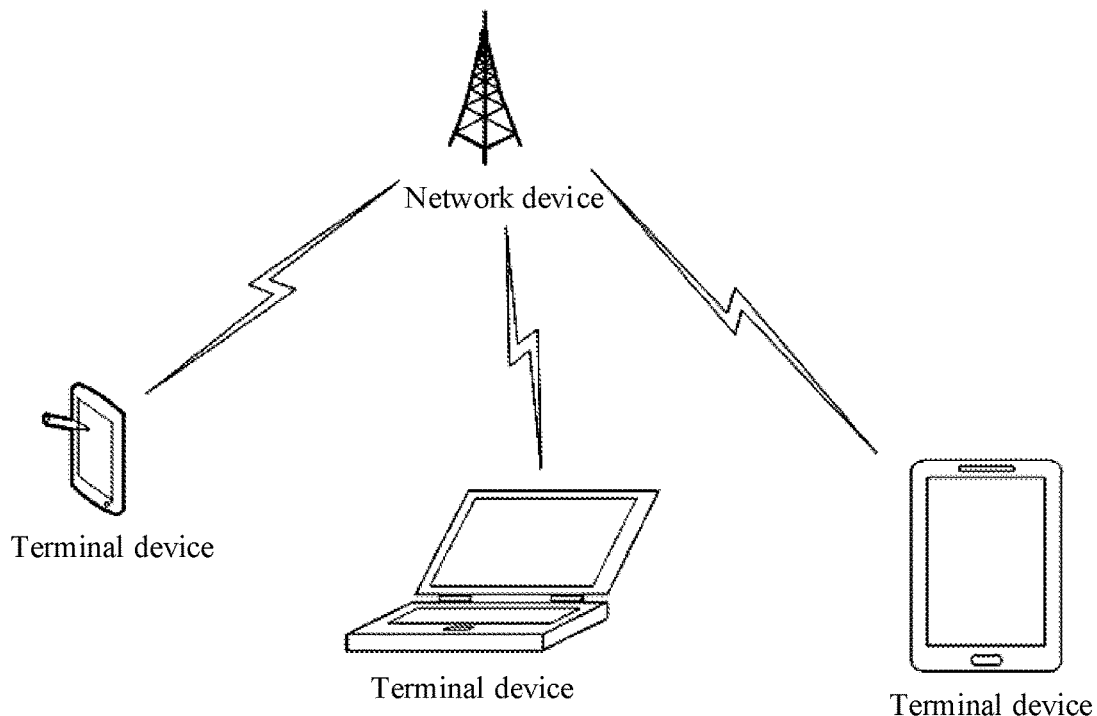
FIG. 1 is a schematic architectural diagram of a communications system to which a communication method is applicable according to an embodiment of this application.

FIG. 1 is a schematic architectural diagram of a communications system to which a communication method is applicable according to an embodiment of this application. In the schematic diagram, the network device is, for example, a gNB, and the network device sends a first physical channel to user equipment on resources of one or more candidate physical channels. Correspondingly, the user equipment monitors the one or more candidate physical channels in a candidate physical channel set, to receive the first physical channel on the resources of the one or more candidate physical channels. A payload of the first physical channel includes control information and a transport block, the control information includes first information, the first information is used to indicate an acknowledgment resource to the user equipment, and the acknowledgment resource is a resource used by the user equipment to send acknowledgment information to the network device. After receiving the first physical channel, the user equipment sends the acknowledgment information to the network device on the acknowledgment resource; and correspondingly, the network device receives the acknowledgment information on the acknowledgment resource. The following describes in detail the communication method in this application based on the system architecture shown in FIG. 1. For details, refer to FIG. 2.

Figure 2:
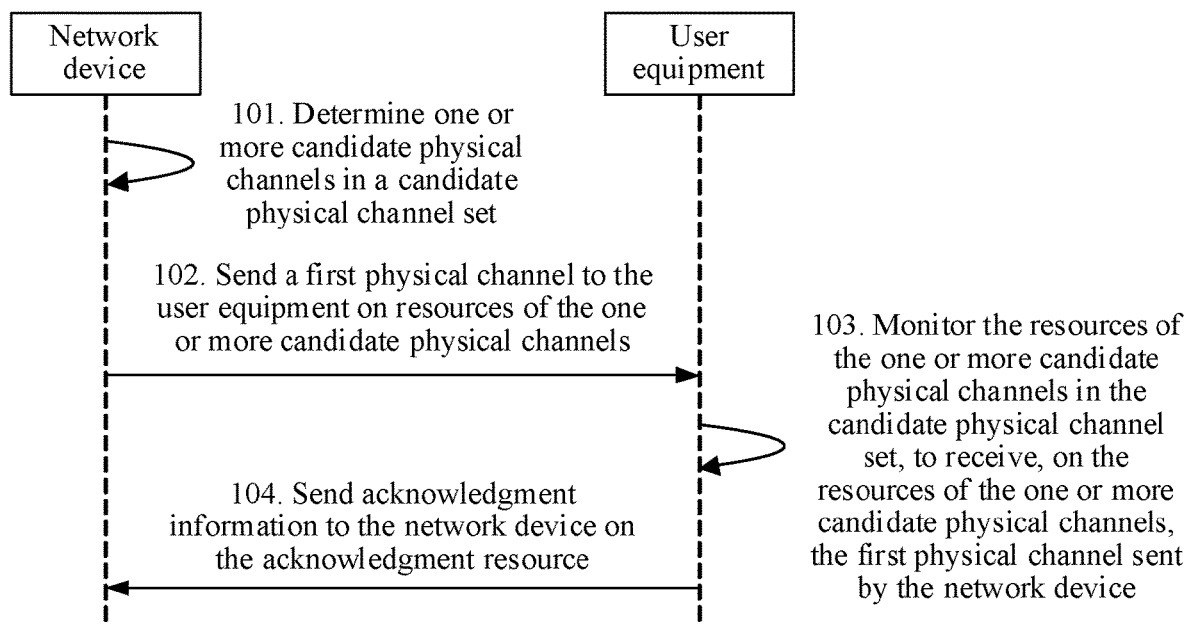
FIG. 2 is a flowchart of a communication method according to an embodiment of this application.

FIG. 2 is a flowchart of a communication method according to an embodiment of this application. In this embodiment, the communication method described in this application is described from a perspective of interaction between a network device and user equipment. This embodiment includes the following operations.

101. Determine one or more candidate physical channels in a candidate physical channel set.

In this embodiment of the present invention, a candidate physical channel set is configured by a higher layer of the network device, and the candidate physical channel set may be notified to the user equipment by using higher layer signaling, or the network device/the user equipment pre-defines a candidate physical channel set.

In this operation, the one or more candidate physical channels are determined in the predefined candidate physical channel set or the candidate physical channel set configured by the higher layer. For example, the one or more candidate physical channels may be determined in the candidate physical channel set based on a channel condition of the user equipment, requirements on performance such as reliability and a latency of service data, and a use status (for example, multiplexing with another user equipment) of the candidate physical channel in the candidate physical channel set. Generally, one or more candidate physical channels of different users occupy different resources.

102. Send a first physical channel to the user equipment on resources of the one or more candidate physical channels.

A payload of the first physical channel includes control information and a transport block, the control information includes first information, the first information is used to indicate an acknowledgment resource to the user equipment, and the acknowledgment resource is a resource used by the user equipment to send acknowledgment information to the network device.

In this operation, the network device includes the control information and the transport block in the payload of the first physical channel, and sends the payload to the user equipment by using the resources of the one or more candidate physical channels.

In this embodiment of this application, there may be one or more transport blocks, and the one or more transport blocks may be from a media access control (MAC) layer protocol data unit (PDU), or from a higher layer message. In addition, in this embodiment of this application, a size of the transport block may be predefined or may be configured by the higher layer, and notified to the user equipment by using the higher layer signaling. The higher layer signaling is, for example, a radio resource control information element (RRC IE), or a media access control control element (MAC CE). The transport block may be various types of service data. For example, the transport block may be periodic VoIP service data. For another example, the transport block may be aperiodic, distributed, and burst URLLC service data.

103. Monitor resources of the one or more candidate physical channels in the candidate physical channel set, to receive the first physical channel sent by the network device.

The payload of the first physical channel includes the control information and the transport block, the control information includes the first information, the first information is used to indicate the acknowledgment resource to the user equipment, and the acknowledgment resource is a resource used by the user equipment to send the acknowledgment information to the network device.

In this operation, the user equipment monitors the resources of the one or more candidate physical channels in the candidate physical channel set, to receive, on the resources of the one or more candidate physical channels through blind detection, the first physical channel sent by the network device.

104. Send the acknowledgment information to the network device on the acknowledgment resource.

In this operation, the user equipment sends the acknowledgment information to the network device on the acknowledgment resource that is indicated by the first information; and correspondingly, the network device receives, on the acknowledgment resource that is indicated by the first information, the acknowledgment information sent by the user equipment. The acknowledgment resource is the same as the acknowledgment resource that is indicated by the first information. In other words, the acknowledgment resource in this operation is the acknowledgment resource that is indicated by the first information in operation 101.

According to the communication method provided in this embodiment of this application, the network device sends the first physical channel to the user equipment on the resources of the one or more candidate physical channels. Correspondingly, the user equipment monitors the one or more candidate physical channels in the candidate physical channel set, to receive the first physical channel on the resources of the one or more candidate physical channels. The payload of the first physical channel includes the control information and the transport block, the control information includes the first information, the first information is used to indicate the acknowledgment resource to the user equipment, and the acknowledgment resource is a resource used by the user equipment to send the acknowledgment information to the network device. After receiving the first physical channel, the user equipment sends the acknowledgment information to the network device on the acknowledgment resource; and correspondingly, the network device receives the acknowledgment information on the acknowledgment resource. In this process, the network device does not need to periodically configure, for the user equipment, resources for sending the first physical channel, thereby avoiding a waste of resources. Moreover, the transport block included in the payload of the first physical channel may be a transport block of any service type. Therefore, a requirement of a burst high-reliable and low-latency URLLC service can be met. In addition, the network device may flexibly specify, based on a service type of the transport block in the payload of the first physical channel and by using the first information in the control information included in the payload of the first physical channel, the acknowledgment resource for carrying the acknowledgment information.

The following describes in detail the payload of the first physical channel in the foregoing embodiment.

In one embodiment, the payload of the first physical channel further includes cyclic redundancy check (CRC) information of the control information and the transport block.

Specifically, the transport block and the control information may be jointly used to generate the CRC information or other check information. The network device may include the CRC check information in the payload, and send the payload to the user equipment through the first physical channel, to flexibly send the CRC information.

It should be noted that this embodiment of this application is described in detail by using an example in which the transport block and the control information are jointly used to generate the CRC information. However, this embodiment of this application is not limited thereto. In another possible implementation, no CRC information or other check information may be attached to the transport block. Alternatively, CRC information or other check information, for example, parity check information, may be separately attached to the transport block.

The following describes in detail the first information and the acknowledgment resource that is indicated by the first information in the foregoing embodiment.

In one embodiment, the first information is used to indicate, to the user equipment, the acknowledgment resource for sending the acknowledgment information, and the acknowledgment information may be carried on a physical uplink control channel (PUCCH). Therefore, the acknowledgment resource that is indicated by the first information may be a resource used for the acknowledgment information sent on the PUCCH, and specifically includes a time domain resource, a frequency domain resource, a sequence or a code, and hopping information.

The time domain resource may be, for example, indicated by using a start symbol and length information, or indicated by using a symbol set.

The frequency domain resource may be, for example, indicated by a resource block set used by a PUCCH, and the resource block set may include consecutive or discrete resource blocks (RB) in frequency domain.

For the sequence or the code, the sequence may be a random access (Zadoff Chu (ZC)) sequence, a discrete Fourier transform (DFT) sequence, a computer generated sequence (CGS), or a kronecker product of any two of the Zadoff Chu sequence, the DFT sequence, or the CGS. The code is an orthogonal cover code (OCC). The sequences or the code is mapped to a time domain resource or a frequency domain resource. For example, in frequency domain, one ZC sequence, one DFT sequence, or one CGS is mapped to one or more RBs. In time domain, one OCC, one DFT sequence, or one CGS is mapped to two or more symbols, where a length of the sequence is equal to a quantity of symbols.

The first information is used to indicate at least one of the time domain resource, the frequency domain resource, the sequence or the code, and the hopping information. In addition, the first information may be further used to indicate a slot or a subframe of the PUCCH that carries the acknowledgment information. For example, the first information indicates that the PUCCH that carries the acknowledgment information and the first physical channel are on different symbols in a same slot; or the first information indicates that the PUCCH that carries the acknowledgment information is in a fourth slot after the first physical channel.

It can be learned from the foregoing description that when the user equipment sends the acknowledgment information to the network device after detecting the first physical channel, correspondingly, the network device receives the acknowledgment information. That the network device receives the acknowledgment information is specifically receiving, by receiving a resource of the sequence or the code, through the PUCCH and on a time domain resource, a frequency domain resource, or hopping that is specified by the first information, the acknowledgment information sent by the user equipment.

In one embodiment, the first information is used to indicate, to the user equipment, the acknowledgment resource for sending the acknowledgment information, and the acknowledgment information may be carried on a physical uplink shared channel (PUSCH). Therefore, the acknowledgment resource that is indicated by the first information may be a resource used for the acknowledgment information sent on the PUSCH, and specifically includes a time domain resource, a frequency domain resource, ACK channel coding information, and a sequence or a code.

The time domain resource may be, for example, indicated by using a start symbol and length information, or indicated by using a symbol set.

The frequency domain resource may be indicated by, for example, locations of subcarriers in a resource block set used by a PUSCH, and the locations of the subcarriers are consecutive or discrete in frequency domain.

The ACK channel coding information includes a channel coding parameter, such as a coding scheme, a coding type, a code rate, or a code rate set.

For the sequence or the code, the sequence may be a random access (Zadoff Chu (ZC)) sequence, a discrete Fourier transform (DFT) sequence, a computer generated sequence (CGS), or a kronecker product of any two of the Zadoff Chu sequence, the DFT sequence, or the CGS. The code is an orthogonal cover code (OCC). The sequences or the code is mapped to a time domain resource or a frequency domain resource. For example, in frequency domain, one ZC sequence, one DFT sequence, or one CGS is mapped to one or more RBs. In time domain, one OCC, one DFT sequence, or one CGS is mapped to two or more symbols, where a length of the sequence is equal to a quantity of symbols.

The first information is used to indicate at least one of the time domain resource, the frequency domain resource, the ACK channel coding information, and the sequence or the code. In addition, the first information may further indicate a slot or a subframe of the PUSCH that carries the acknowledgment information. For example, the first information indicates that the PUSCH that carries the acknowledgment information and the first physical channel are on different symbols in a same slot; or the first information indicates that the PUSCH that carries the acknowledgment information is in a fourth slot after the first physical channel.

The following describes in detail the acknowledgment information in the foregoing embodiment.

In one embodiment, the acknowledgment information is used to indicate that the user equipment correctly receives the payload.

Specifically, if the user equipment successfully performs blind detection on the one or more candidate physical channels, and correctly receives the payload of the first physical channel, the user equipment sends ACK information to the network device, to indicate, to the network device, that the user equipment correctly receives the payload. In this case, the control information and the transport block are jointly used to generate the CRC information. The ACK information is sent only when check of the jointly generated CRC information succeeds by using the received payload. If the check of the jointly generated CRC information fails by using the received payload, the payload is not correctly received.

When the user equipment does not correctly receive the payload, the user equipment does not send the acknowledgment information. In this case, if the network device cannot receive the acknowledgment information on the acknowledgment resource, it is considered that the payload is not correctly received by the user equipment.

In one embodiment, the acknowledgment information is used to indicate that the user equipment correctly receives the transport block.

Specifically, if the user equipment successfully performs blind detection on the one or more candidate physical channels, and correctly receives the transport block in the payload of the first physical channel, the user equipment sends the ACK information to the network device, to indicate that the user equipment correctly receives the transport block. In this case, the control information and the transport block are separately used to generate the CRC information. The ACK information is sent when check of the CRC information generated by the transport block succeeds and check of the CRC information generated by the control information succeeds by using the received payload.

When the user equipment does not correctly receive the transport block, the user equipment does not send the acknowledgment information. In this case, if the network device cannot receive the acknowledgment information on the acknowledgment resource, it is considered that the transport block is not correctly received by the user equipment.

In one embodiment, the acknowledgment information is used to indicate that the user equipment correctly receives the transport block or indicate that the user equipment does not correctly receive the transport block.

Specifically, if the user equipment successfully performs blind detection on the one or more candidate physical channels, and successfully receives the transport block in the payload of the first physical channel, the user equipment sends the ACK information to the network device, to indicate that the user equipment correctly receives the transport block. Otherwise, if blind detection performed by the user equipment on the one or more candidate physical channels fails, and the transport block in the payload of the first physical channel is not successfully received, the user equipment sends NACK information to the network device, to indicate that the user equipment does not correctly receive the transport block. When the user equipment correctly receives the transport block, it indicates that the control information and the transport block are separately used to generate the CRC information, the check of the CRC information generated by the transport block is correct, and the check of the CRC information generated by the control information is correct. When the user equipment does not correctly receive the transport block, it indicates that the control information and the transport block are separately used to generate the CRC information, the check of the CRC information generated by the transport block is incorrect, but the check of the CRC information attached to the control information is correct.

It should be noted that, whether the payload or the transport block is correctly received is determined based on whether the CRC check on the payload or the transport block succeeds. However, this embodiment of this application is not limited thereto. In another possible implementation, whether the payload or the transport block is successfully received may alternatively be determined in another check manner. For example, whether the payload or the transport block is correctly received is determined by determining whether a detection quantity of the first physical channel exceeds a preset threshold.

In the foregoing embodiment of this application, the network device sends the first physical channel to the user equipment, where the first physical channel includes the transport block and the control information, the control information includes the first information that indicates the acknowledgment resource, and the transport block and the first information may be jointly used to generate additional CRC. When correctly receiving the payload or the transport block, the user equipment sends the acknowledgment information on the acknowledgment resource that is indicated by the first information. The network device may flexibly specify a location of the acknowledgment resource by using the first information, so that different latency requirements for data sending can be met based on different service types, thereby improving flexibility of a data transmission latency of a system. Particularly, when the network device does not send the first physical channel, the user equipment does not need to send the acknowledgment information, thereby improving flexibility of sending the first physical channel by the network device.

The following describes in detail the control information of the first physical channel in the foregoing embodiment.

In one embodiment, the control information further includes: an identifier of a process used for sending the transport block, and/or power control information of an uplink physical channel of the user equipment.

First, the identifier (ID) of the process is described.

Specifically, the network device sends the transport block to the user equipment by using a process corresponding to the process ID. The acknowledgment information (mainly ACK information) received by the network device corresponds to the transport block corresponding to the process ID.

For example, the network device sends one or more transport blocks to the user equipment by using the process corresponding to the process ID, and the network device receives one piece of ACK information, where the ACK corresponds to the transport blocks corresponding to the process ID, that is, the ACK corresponds to the one or more transport blocks.

For another example, the network device sends a plurality of transport blocks to the user equipment by using the process corresponding to the process ID, and the network device receives a plurality of pieces of ACK information, where each piece of ACK information corresponds to one transport block.

In this embodiment of this application, a total quantity of process IDs, that is, a total quantity of processes, may be predefined or configured by using higher layer signaling, and the higher layer signaling is, for example, an RRC IE or a MAC CE.

In this embodiment of this application, the control information of the first physical channel further includes the identifier of the process used for sending the transport block. The network device receives acknowledgment information corresponding to the identifier of the process, and may enable a plurality of processes to transmit the transport block within a loopback time of data transmission, so that transmission efficiency is improved. In addition, reliability of transmission of the transport block can be improved by using a same process to retransmit the transport block. Further, the network device may flexibly configure a total quantity of processes, that is, a total quantity of identifiers of processes, to meet different latency requirements in different loopback time of the data transmission.

Second, the power control information is described.

Specifically, the network device may include the power control information of the uplink physical channel in the control information, and send the control information to the user equipment through the first physical channel, so that the user equipment determines power of the uplink physical channel based on the power control information, and sends the uplink physical channel to the network device. For example, the power control information may be power control information of a PUCCH, and may specifically include power control information of a reference signal or data of the PUCCH. For another example, the power control information may be power control information of a PUSCH, and may specifically include power information of a reference signal or data of the PUSCH. For still another example, the power control information may be power control information of a sounding reference signal (SRS).

It is assumed that the user equipment sends the acknowledgment information on the PUCCH or the PUSCH, the acknowledgment information is sent on the PUCCH or the PUSCH by using corresponding power based on the power control information. Correspondingly, the PUCCH or the PUSCH is received.

Figure 3A:
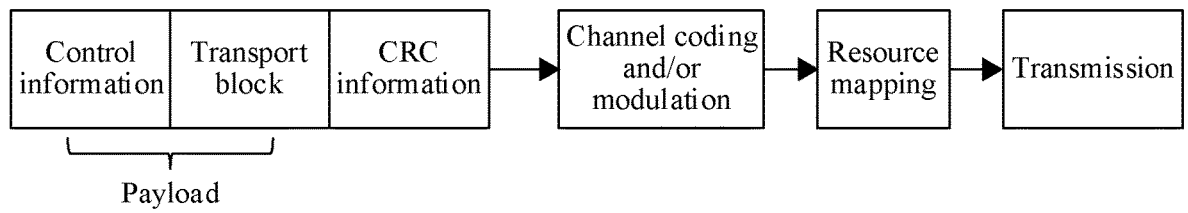
FIG. 3A is a schematic diagram of a sending process of a first physical channel in a communication method according to an embodiment of this application.

FIG. 3A is a schematic diagram of a sending process of a first physical channel in a communication method according to an embodiment of this application. As shown in FIG. 3A, the first physical channel includes a payload and CRC information, and the payload includes control information and a transport block. The control information includes the first information, and may further include the process ID or the power control information. In a sending process, after channel coding and/or modulation is performed on the payload and the CRC information that are included in the first physical channel, resource mapping is performed, that is, the first physical channel is mapped to physical resources of the one or more candidate physical channels, and then the first physical channel is sent on the physical resources.

Figure 3B:
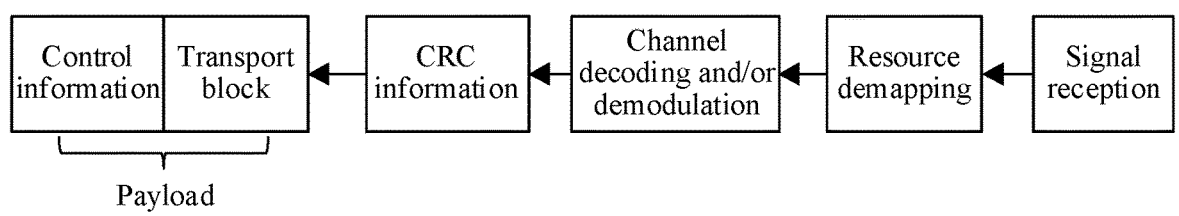
FIG. 3B is a schematic diagram of a receiving process of a first physical channel in a communication method according to an embodiment of this application.

FIG. 3B is a schematic diagram of a receiving process of a first physical channel in a communication method according to an embodiment of this application. As shown in FIG. 3B, the first physical channel includes a payload and CRC information, and the payload includes control information and a transport block. In a receiving process, after receiving a signal, the user equipment performs resource demapping, then performs channel decoding and/or demodulation on the received signal to obtain CRC information, and checks the control information and/or the transport block based on the CRC information.

In this embodiment of this application, the control information of the first physical channel further includes power control information of an uplink physical channel. Therefore, the network device may adjust power of the uplink physical channel based on channel conditions of different user equipments, thereby improving reliability of sending acknowledgment information on the uplink physical channel.

The following describes in detail the way in which the one or more candidate physical channels are selected from the candidate physical channel set in the foregoing embodiment.

In one embodiment, when determining the one or more candidate physical channels in the candidate physical channel set, the network device determines the one or more candidate physical channels based on a configuration of the candidate physical channel set. Correspondingly, that the user equipment monitors the one or more candidate physical channels in the candidate physical channel set, to receive a first physical channel sent by the network device specifically includes: monitoring the one or more candidate physical channels in the candidate physical channel set based on the configuration of the candidate physical channel set, to receive the first physical channel sent by the network device, where the configuration of the candidate physical channel set includes one or more sizes of the one or more candidate physical channels in the candidate physical channel set and a quantity of the candidate physical channels in the candidate physical channel set.

First, the candidate physical channel is described.

Specifically, the size of the candidate physical channel may be defined based on a resource used by the candidate physical channel. Each candidate physical channel may correspond to one or more channel elements (CE), and one CE may correspond to one or more physical resources. Therefore, one candidate physical channel corresponds to the one or more physical resources. The one or more physical resources may be one or more physical resource blocks (RB), or the one or more physical resources may be a resource element group (REG). A quantity of CEs or RBs corresponding to the candidate physical channel is referred to as the size of the candidate physical channel, or referred to as an aggregation level (AL) of the candidate physical channel.

The physical resource corresponding to each candidate physical channel may be determined based on a resource configuration of the candidate physical channel. The resource configuration of the candidate physical channel at least includes information about a time domain resource and/or a frequency domain resource that are/is available to the candidate physical channel. The information about the resource configuration of the candidate physical channel may include one or more of the following information: a time domain resource, a frequency domain resource, a parameter of a reference signal (RS) used for sending the candidate physical channel, precoding-related information of the candidate physical channel, a mapping parameter from the candidate physical channel to a resource, and information related to an antenna port. The following describes the information in detail.

The time domain resource may be consecutive or discrete symbols or slots, for example, may be indicated by using a start location of a symbol and length information of the symbol.

The frequency domain resource may be a set of consecutive or discrete resource blocks RBs, for example, consecutive 24 RBs or 48 RBs or 96 RBs. An offset of a location of a starting RB relative to a location of an RB of a resource of a broadcast channel or a synchronization signal may be 0, 2, 4, 12, 16, or 38; or the offset may be 5, 6, 7, 8, or 20; or the offset may be 28, 56, or the like.

The parameter of the RS used for sending the candidate physical channel is, for example, an initialization value of an RS sequence or a parameter of an orthogonal RS sequence. For another example, the parameter of the RS used for sending the candidate physical channel is a used OCC index value or an OCC index value set.

The precoding-related information of the candidate physical channel is, for example, granularity information used by a precoding matrix.

The mapping parameter from the candidate physical channel to the resource is, for example, mapping information from an element of the candidate physical channel to an element or an element set of the resource set.

The information related to the antenna port means, for example, quasi co-location (QCL) of a reference signal corresponding to the candidate physical channel and another signal.

All or some of the information about the resource configuration of the candidate physical channel may be predefined, or may be configured or notified by the network device by using a higher layer. For example, the information is configured by an RRC or by a MAC; or for another example, the information is notified by using an RRC IE or by using a MAC CE. In addition, there may be one or more resource configurations of the candidate physical channel.

Then, the candidate physical channel set is described.

Specifically, there may be one or more candidate physical channel sets, and a configuration of each candidate physical channel set includes a size and a quantity, where the size is one or more sizes of one or more candidate physical channels in the candidate physical channel set, and the quantity is a quantity of candidate physical channels in the candidate physical channel set. During specific implementation, the configuration of the candidate physical channel set may be predefined. In this case, the configuration of the candidate physical channel set is predefined in a protocol. Therefore, the candidate physical channel set is known to both the network device and the user equipment. Alternatively, the configuration of the candidate physical channel set is configured or notified by using higher layer signaling. The network device notifies the user equipment of a plurality of candidate physical channels by using the higher layer signaling, and the higher layer signaling is, for example, an RRC IE or a MAC CE.

In this embodiment of this application, a size of one candidate physical channel may be indicated by a channel element corresponding to the candidate physical channel. Specifically, one candidate physical channel may correspond to L channel elements, and a value of L is, for example, 1, 2, 4, 8, or 16. Sizes of all the candidate physical channels may be the same or different in one candidate physical channel set. For example, one candidate physical channel set includes eight candidate physical channels, where L corresponding to each of the eight candidate physical channels is 4, that is, each candidate physical channel corresponds to four channel elements. For another example, one candidate physical channel set includes eight candidate physical channels, where L corresponding to each of four candidate physical channels is 2, and L corresponding to each of the other four candidate physical channels is 4.

In the foregoing candidate physical channel set, sizes of all the candidate physical channels may be the same. In addition, in one candidate physical channel set, sizes of all the candidate physical channels may also be different. For example, the candidate physical channel set is divided into a plurality of subsets, and sizes of candidate physical channels in each subset may be separately specified.

Without loss of generality, in the following embodiments, the method in this application is described in detail by using an example in which sizes of all the candidate physical channels in one candidate physical channel set are the same.

In this embodiment of this application, the configuration of the candidate physical channel set includes the size and the quantity. Assuming that the size of the candidate physical channel is L, the configuration of the candidate physical channel set may be:

For L=1, a quantity of candidate physical channels that can be configured in the candidate physical channel set is {0, 1, 2, 3, 4, 5, 6, 8}.

For L=2, a quantity of candidate physical channels that can be configured in the candidate physical channel set is {0, 1, 2, 3, 4, 5, 6, 8}.

For L=4, a quantity of candidate physical channels that can be configured in the candidate physical channel set is {0, 1, 2, 3, 4, 5, 6, 8}.

For L=8, a quantity of candidate physical channels that can be configured in the candidate physical channel set is {0, 1, 2, 3, 4, 5, 6, 8}.

For L=16, a quantity of candidate physical channels that can be configured in the candidate physical channel set is {0, 1, 2, 3, 4, 5, 6, 8}.

For example, if there is a total of 16 CEs, the configuration of the candidate physical channel set is shown in Table 1.

TABLE 1

| Size of a candidate physical channel and a quantity of candidate physical channels ||
| Size L of a candidate physical channel | Quantity of candidate physical channels |
| --- | --- |
| 4 | 4 |
| 8 | 2 |
| 16 | 1 |

As shown in Table 1, when the size L of the candidate physical channel is equal to 4, there are four candidate physical channels in the candidate physical channel set; when the size L of the candidate physical channel is equal to 8, there are two candidate physical channels in the candidate physical channel set; and when the size L of the candidate physical channel is equal to 18, there is one candidate physical channel in the candidate physical channel set.

Finally, a relationship between the configuration of the candidate physical channel set and the configuration of the candidate physical channel is described.

In one embodiment, the configuration of the candidate physical channel set and the configuration of the candidate physical channel may be independently configured or predefined. For example, the configuration of the candidate physical channel set may be associated with a resource configuration of the candidate physical channel by using an index. For another example, the configuration of the candidate physical channel set may be associated with resource configurations of one or more candidate physical channels. For still another example, a resource configuration of the candidate physical channel may be associated with configurations of one or more candidate physical channel sets.

In one embodiment, the configuration of the candidate physical channel set and the configuration of the candidate physical channel may be jointly configured or predefined. During joint configuration, the network device determines, based on the configuration of the candidate physical channel set, the one or more candidate physical channels used by the first physical channel.

For example, the network device may determine the size of the candidate physical channel based on a channel condition of the user equipment and a transmission reliability requirement. One candidate physical channel includes one or more CEs.

Specifically, the network device may determine a size (that is, a quantity of CEs corresponding to the candidate physical channel) of the candidate physical channel based on different reliability requirements, and a performance curve of a signal to interference plus noise ratio (SINR) and a target block error ratio (BLER) that corresponds to the reliability requirements. Generally, a higher reliability requirement, that is, a lower BLER, indicates a smaller size of the candidate physical channel, that is, a smaller quantity of CEs corresponding to the candidate physical channel. For example, for a 10% target BLER requirement, the size of the candidate physical channel is two, that is, the candidate physical channel uses two CEs; or for a 1% target BLER requirement, the size of the candidate physical channel is eight, that is, the candidate physical channel uses eight CEs.

For another example, the network device may select, with multiplexing of different user equipments, the one or more candidate physical channels from the candidate physical channel set based on a total quantity of available CEs, to send the first physical channel. In a selection process, a location of the candidate physical channel is mainly considered.

Specifically, to prevent CEs occupied by candidate physical channels used by different user equipments from blocking each other, when a quantity of channel elements is specified, an index of the channel element corresponding to the candidate physical channel may be obtained according to a predefined randomization function. The randomization function is, for example, the following Hash function:

$$L \cdot \left\{ \left( Y_{n_f^\mu} + \left\lfloor \frac{m_{n_{CI}} \cdot N_{CE}}{L \cdot M_{max}^{(L)}} \right\rfloor + n_{CI} \right) \bmod \lfloor N_{CE}/L \rfloor \right\} + i; i = 0, \ldots, L-1,$$

where
$Y_{n_f^\mu}=0$, or
$Y_{n_f^\mu}=(A \cdot Y_{n_f^\mu -1}) \bmod D$, $Y_{-1}=n_{RNTI} \neq 0$, $D=65537$, A=39827, or A=39829, or A=39839,
$N_{CE}$ is a total quantity of channel elements, and an index of the channel element ranges from 0 to $N_{CE}-1$;
$n_{CI}=0$ is a carrier indicator field value configured by using higher layer signaling;
$m_{n_{CI}}=0, \ldots, M_{n_{CI}}^{(L)}-1$ where $M_{n_{CI}}^{(L)}$ is a quantity of candidate physical channels of the user equipment for a given quantity of CEs; and
$M_{max}^{(L)}$ is a value configured by using higher layer signaling, or is a maximum value in values of $M_{n_{CI}}^{(L)}$ configured on a plurality of carriers.

It should be noted that the foregoing parameters may be other specific values. This is not limited in this application.

In the foregoing embodiment, the network device determines the one or more candidate physical channels based on the configuration of the candidate physical channel set. The configuration of the candidate physical channel set includes the one or more sizes of the one or more candidate physical channels and the quantity of the candidate physical channels. In a specific implementation process, the network device may flexibly select the one or more sizes of the candidate physical channels based on a channel condition of the user equipment and requirements on reliability and a latency of data transmission; select the one or more candidate physical channels from the candidate physical channel set; and send the first physical channel on resources of the one or more selected candidate physical channels, thereby implementing link self-adaptation, improving transmission reliability, and meeting a sending latency requirement.

It should be further noted that the candidate physical channel may correspond to one CE or a plurality of CEs, and candidate physical channels corresponding to the plurality of CEs may be aggregated to form one aggregated candidate physical channel. The foregoing method for determining the quantity and locations of the plurality of CEs may be used for aggregation of the candidate physical channels. In other words, the foregoing method for determining the quantity and locations of CEs may be replaced with a method for determining a quantity and locations of candidate physical channels, to obtain a resource of the aggregated candidate physical channel. A process in which the first physical channel is sent by using the resource of the aggregated candidate physical channel is similar to the process shown in FIG. 3. However, an actual resource of the aggregated candidate physical channel need to be considered for a payload size, channel coding and/or modulation, a resource mapping process, and the like.

The following describes in detail how the network device sends the first physical channel to the user equipment by using the resource of the aggregated candidate physical channel when the configuration of the candidate physical channel set includes aggregation information of the candidate physical channel.

Specifically, the aggregation information of the candidate physical channel indicates aggregation of candidate physical channels of a same size or different sizes. For example, the aggregated candidate physical channel uses a resource set of same physical channels. For another example, the aggregated physical channel uses a resource set of different physical channels.

For example, the configuration of the candidate physical channel set is associated with resource sets (S1 and S2) of two candidate physical channels. A candidate physical channel in the resource set S1 configured in the candidate physical channel set is $C_{1,i}$, where i=0, 1, . . . , $N_1$−1; and a candidate physical channel in the resource set S2 configured in the candidate physical channel set is $C_{2,i}$, where i=0, 1, . . . , $N_2$−1. In this case, the candidate physical channels $C_{1,i}$ and the candidate physical channels $C_{2,i}$ form an aggregated candidate physical channel where i=0, 1, . . . , N−1, and N is a minimum value of $N_1$ and $N_2$.

In this embodiment of this application, the configuration of the candidate physical channel set includes the aggregation information of candidate physical channels, and the aggregation information of the candidate physical channels may be sizes of given candidate physical channels and a quantity of aggregated candidate physical channels corresponding to each size. For example, if there is a total of 16 channel elements, a size of a given candidate physical channel and a quantity of corresponding aggregated candidate physical channels may be shown in Table 2 and Table 3.

TABLE 2

Size of a candidate physical channel and a quantity of candidate physical channels

| Size L of a candidate physical channel | Quantity of candidate physical channels in a resource set S1 | Quantity of candidate physical channels in a resource set S2 |
| --- | --- | --- |
| 4 | 4 | 4 |
| 8 | 2 | 2 |
| 16 | 1 | 1 |

TABLE 3

Size of an aggregated candidate physical channel and a quantity of aggregated candidate physical channels

| Size L of an aggregated candidate physical channel | Quantity of aggregated candidate physical channels |
| --- | --- |
| 8 | 4 |
| 16 | 2 |
| 31 | 1 |

As shown in Table 2 and Table 3, when the size L of the candidate physical channel is equal to 4, there are four candidate physical channels in the resource set S1, and there are four candidate physical channels in the resource set S2. In this case, the size of the aggregated candidate physical channel is 8, and there are four aggregated candidate physical channels.

In the foregoing embodiment of this application, the network device may determine a plurality of candidate physical channels as the aggregated candidate physical channels based on the configuration of the candidate physical channel set. The network device may select the aggregated candidate physical channel based on a condition of the user equipment and requirements on reliability and a latency of data transmission, to further improve transmission reliability and meet a sending latency requirement.

Further, when the network device determines the one or more candidate physical channels based on the configuration of the candidate physical channel set, a format of a payload may be further considered. In this case, the network device determines the one or more candidate physical channels based on the format of the payload and the configuration of the candidate physical channel set. Correspondingly, when monitoring the one or more candidate physical channels based on the configuration of the candidate physical channel set, the user equipment specifically monitors the one or more candidate physical channels based on the format of the payload and the configuration of the candidate physical channel set. The format of the payload is predefined, or is configured by using higher layer signaling.

Specifically, the format of the payload may be defined differently based on content, a size, a structure, or the like of the payload. The content of the payload may be used for different service types or purposes; the size of the payload may be 20 bits, 32 bits, 44 bits, 64 bits, 80 bits, or the like; and the structure of the payload may be composition of different fields of the payload or values of different fields.

Further, when the network device determines the one or more candidate physical channels based on the configuration of the candidate physical channel set, a format of a transport block may be further considered. In this case, the network device determines the one or more candidate physical channels based on the format of the transport block and the configuration of the candidate physical channel set, where the format of the transport block is predefined or configured by using higher layer signaling. During specific implementation, the format of the transport block may be included in the configuration of the candidate physical channel set. In this case, the configuration of the candidate physical channel set supports the format of the transport block. Alternatively, the format of the transport block is independent of the configuration of the candidate physical channel set.

Specifically, the format of the transport block may be defined differently based on content, a size, a structure, or the like of the transport block. The content of the transport block may be used for different service types or purposes; the size of the transport block may be 20 bits, 32 bits, 44 bits, 64 bits, 80 bits, or the like; and the structure of the transport block may be composition of different fields of the payload or values of different fields.

In this embodiment of this application, when the format of the payload or the format of the transport block is predefined or configured by using the higher layer signaling, the format of the payload or the format of the transport block may also be set in the configuration of the candidate physical channel set. In this case, the configuration of the candidate physical channel set includes one or more sizes and a quantity of candidate physical channels that are included in the candidate physical channel set, and the format of the payload or the format of the transport block. Specifically, the quantity of candidate physical channels may be configured based on the format of the payload, or the one or more sizes of the candidate physical channels and the quantity of candidate physical channels may be configured based on the format of the payload.

In the following, an example in which the format of the payload includes a format F0 and a format F1, or the format of the transport block includes a format F0 and a format F1 is used, and a quantity and sizes of corresponding candidate physical channels are shown in Table 4.

TABLE 4

Format of a payload (or a transport block), and a
size and a quantity of candidate physical channels

| Format of the payload (or the transport block) | Size L of a candidate physical channel | Quantity of candidate physical channels |
|---|---|---|
| F0 | 2 | 4 |
|  | 4 | 2 |
|  | 8 | 1 |
| F1 | 4 | 4 |
|  | 8 | 2 |
|  | 16 | 1 |

It can be learned from Table 4 that, when the format of the payload (or the transport block) is F0, a size of the candidate physical channels in the candidate physical channel set may be 2, 4, or 8, and a quantity of candidate physical channels may be 4, 2, or 1 respectively. When the format of the payload (or the transport block) is F1, a size of the candidate physical channels may be 4, 8, or 16, and a quantity of candidate physical channels may be 4, 2, or 1 respectively.

In the embodiment in Table 4, the configuration of the candidate physical channel set is determined based on the format of the payload (or the transport block). However, this application is not limited thereto. In another possible implementation, the configuration of the candidate physical channel set and the format of the payload (or the transport block) are independent of each other. For details, refer to Table 5.

TABLE 5

Size of a candidate physical channel and
a quantity of candidate physical channels

| Size L of a candidate physical channel | Quantity of candidate physical channels |
|---|---|
| 2 | 4 |
| 4 | 4 |
| 8 | 2 |
| 16 | 1 |

Referring to Table 5, it is assumed that formats of the payload (or the transport block) are F0, F1, F2, and F3, and available formats of the first physical channel are F0 and F1. For the first physical channel in the format F0 and the first physical channel in the format F1, each candidate physical channel set has four optional manners.

For determining of the one or more candidate physical channels based on the format of the payload (or the transport block) and the configuration of the candidate physical channel set, a typical implementation process is as follows:

The network device determines a requirement on performance such as a size, reliability, or a latency of a payload or a transport block of the first physical channel based on a format of the payload (or the transport block). In addition, a channel condition of the user equipment is considered, and the network device determines a quantity and locations of CEs occupied by the one or more candidate physical channels based on the configuration of the candidate physical channel set. Generally, if the transmission reliability requirement is higher, the one or more candidate physical channels occupy more CEs. In this case, the network device may determine the size (that is, the quantity of CEs corresponding to the candidate physical channel) of the candidate physical channel based on different reliability requirements, and a performance curve of an SINR and a BLER that corresponds to the reliability requirements. Generally, a higher reliability requirement, that is, a lower BLER, indicates a smaller size of the candidate physical channel, that is, a smaller quantity of CEs corresponding to the candidate physical channel. For example, for a 10% target BLER requirement, the size of the candidate physical channel is two, that is, the candidate physical channel uses two CEs; or for a 1% target BLER requirement, the size of the candidate physical channel is eight, that is, the candidate physical channel uses eight CEs.

In addition, the network device determines a requirement on performance such as a size, reliability, or a latency of a payload or a transport block of the first physical channel based on a format of the payload (or the transport block). In addition, the network device selects, with multiplexing of different user equipments, the one or more candidate physical channels from the candidate physical channel set based on a total quantity of available CEs, to send the first physical channel.

In the foregoing embodiment, the network device determines the one or more candidate physical channels in the candidate physical channel set based on the format of the payload (or the transport block) of the first physical channel and the configuration of the candidate physical channel set, and sends the first physical channel on the resources of the one or more candidate physical channels. In this process, the network device may flexibly select formats of different payloads (or transport blocks) based on different service requirements, and select the candidate physical channel based on a channel condition of user equipment and requirements on reliability and a latency of data transmission, thereby improving transmission reliability and meeting a sending latency requirement. When the user equipment detects a plurality of candidate physical channels in the candidate physical channel set, a format of an optional payload is used, so that a quantity of times of blind detection can be reduced, thereby reducing a latency of sending the acknowledgment information by the user equipment, and reducing complexity of blind detection.

In one embodiment, when determining the one or more candidate physical channels in the candidate physical channel set, the network device specifically obtains the one or more candidate physical channels from the candidate physical channel set based on repetition quantity configuration information of the first physical channel, where the plurality of candidate physical channels form a candidate physical channel combination, and at least two candidate physical channels in the candidate physical channel combination occupy different time units. Correspondingly, the user equipment monitors the one or more candidate physical channels in the candidate physical channel set, to receive the first physical channel sent by the network device. Specifically, the user equipment monitors, in at least two different time units based on the repetition quantity configuration information of the first physical channel, a candidate physical channel combination in the candidate physical channel set, to receive the first physical channel sent by the network device, where the repetition quantity configuration information of the first physical channel indicates a set of repetition quantities of the first physical channel, payloads of all the candidate physical channels in the candidate physical channel combination are the same, and a configuration of the candidate physical channel combination is predefined or configured by a higher layer.

Specifically, the repetition quantity of the first physical channel may be 1, 2, 4, 8, or the like. Correspondingly, the repetition quantity that may be configured by the network device is 1, 2, 4, 8, or the like. In this embodiment, the repetition quantity configuration information indicates the set of repetition quantities of the first physical channel, and the set of repetition quantities includes at least one repetition quantity value. For example, the set of repetition quantities of the first physical channel may be {1, 2}, {2, 4}, {4, 8}, or the like. For another example, the set of repetition quantities of the first physical channel may be {1}, {2}, {4}, {8}, or the like. In this case, there is one repetition quantity value.

In this embodiment, after determining the one or more candidate physical channels for the first physical channel based on the repetition quantity configuration information of the first physical channel, the network device sends the first physical channel on the resources of the one or more candidate physical channels. In this case, if there are a plurality of candidate physical channels, payloads of first physical channels sent by the network device on resources of the plurality of candidate physical channels are the same. In addition, the first physical channel sent on the resources of the plurality of candidate physical channels may have a same redundancy version or different redundancy versions.

Specifically, after channel coding is performed on a same payload, a same redundancy version (RV) or different redundancy versions may be obtained. For example, after the payload is encoded by using a low-density parity-check code (LDPC), a polar code, or the like, an encoded bit sequence corresponding to mother code is obtained, and different redundancy versions are obtained by truncation, puncturing, or rate matching.

In this embodiment, after determining the one or more candidate physical channels for the first physical channel based on the repetition quantity of the first physical channel, the network device sends the first physical channel on the resources of the one or more candidate physical channels. In this case, if there are a plurality of candidate physical channels, the plurality of candidate physical channels form a candidate physical channel combination. At least two candidate physical channels in the candidate physical channel combination are located in different time units, and a configuration of the candidate physical channel combination is predefined or configured by a higher layer. The time unit may be a slot, a subframe, or the like. If the time unit is a slot, it is assumed that the candidate physical channel set is $\{C_i, i=0, 1, \ldots, N_c-1\}$, where $C_i$ is a candidate physical channel, and $N_c$ is a quantity of candidate physical channels. For two different slots Slot 0 and Slot 1, candidate physical channels $C_i$ in Slot 0 always combine with candidate physical channels $C_i$ in Slot 1 (which may also be explained as that candidate physical channels $C_i$ in Slot 1 always combine with candidate physical channels $C_i$ in Slot 0). For another example, candidate physical channels $C_i$ in Slot 0 always combine with candidate physical channels $C_j$ in Slot 1, where $j=(i+\text{Offset}) \mod N_c$, $i=0, 1, 2, \ldots, N_c-1$ (which may also be explained as that candidate physical channels $C_j$ in Slot 1 always combine with candidate physical channels $C_i$ in Slot 0). In this process, different time units may be configured by using higher layer signaling, for example, configured by using an RRC IE.

In a typical embodiment, the network device may further specify different monitor occasions of the candidate physical channel based on the configuration of the candidate physical channel set, where the different monitor occasions are, for example, different slots or subframes.

In the foregoing embodiment, the network device sends the first physical channel on the plurality of candidate physical channels based on the repetition quantity configuration information of the first physical channel, so that transmission reliability can be further improved. In addition, the set of repetition quantities is indicated by using the repetition quantity configuration information, and the set of repetition quantities includes a plurality of optional repetition quantity values, so that the network device can flexibly select a repetition quantity based on a channel condition of the user equipment. If the repetition quantity is increased, transmission reliability can be improved; or if the repetition quantity is reduced, a data transmission latency may be reduced. Therefore, a compromise can be made between the reliability and the latency, thereby flexibly adapting to flexibility of data transmission.

Further, in the foregoing embodiment, when the network device determines the one or more candidate physical channels for the first physical channel based on the repetition quantity configuration information of the first physical channel, the control information of the first payload further includes second information, where the second information indicates a repetition quantity value of the first physical channel, and the repetition quantity value belongs to a set of repetition quantities indicated by the repetition quantity configuration information of the first physical channel.

In this embodiment, the control information of the first physical channel further includes the repetition quantity value of the first physical channel, where the repetition quantity value belongs to the set of repetition quantities indicated by the repetition quantity configuration information. After learning of the repetition quantity value, the user equipment may accurately obtain an end moment for sending the first physical channel, and may accurately learn of timing of the first physical channel and the acknowledgment resource (channel), to quickly feed back the acknowledgment information.

In one embodiment, when determining the one or more candidate physical channels in the candidate physical channel set, the network device specifically obtains the one or more candidate physical channels from the candidate physical channel set based on a repetition period configuration of the first physical channel. The repetition period configuration is predefined or is configured by a higher layer. For example, the repetition period configuration is configured by an RRC IE or notified by a MAC CE; or for another example, the repetition period configuration is configured by an RRC IE and notified by a MAC CE.

In this embodiment, the repetition period configuration may be a plurality of time units, for example, 1, 2, 4, 5, 6, and 8 time units, and the time unit may be, for example, a symbol, a slot, a subframe, a millisecond (ms), or a channel configuration period. In the repetition period of the first physical channel, different resource locations of the first physical channel may be configured or notified by using higher layer signaling. For example, the repetition period configuration is configured by an RRC IE or notified by a MAC CE; or for another example, the repetition period configuration is configured by an RRC IE and notified by a MAC CE. The following describes in detail a repetition period configuration of the first physical channel by using a bitmap and by using an example in which the time window is 20 time units. For details, refer to FIG. 4A, FIG. 4B, and FIG. 4C.

Figure 4A:
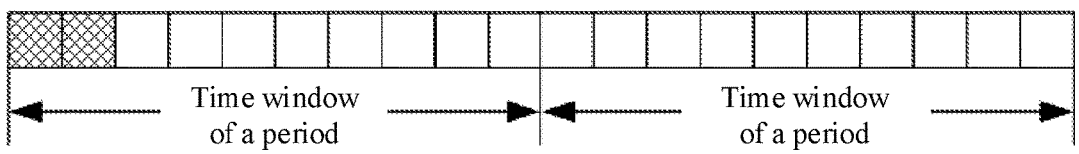
FIG. 4A is a schematic diagram of a repetition period configuration applicable to a communication method according to an embodiment of this application.

FIG. 4A is a schematic diagram of a repetition period configuration applicable to a communication method according to an embodiment of this application. Referring to FIG. 4A, the repetition period of the time window is 20 time units, and a first time unit and a second time unit are used to repeatedly send the first physical channel. In this case, the bitmap may be 11000000000000000000. The first time unit and the second time unit, that is, resources for sending the first physical channel, are shown by a grid-filled part in the figure.

Figure 4B:
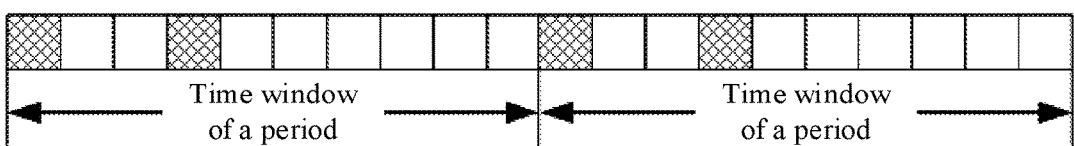
FIG. 4B is a schematic diagram of a repetition period configuration applicable to a communication method according to another embodiment of this application.

FIG. 4B is a schematic diagram of a repetition period configuration applicable to a communication method according to another embodiment of this application. Referring to FIG. 4B, the repetition period of the time window is 20 time units, and a first time unit and a fourth time unit are used to repeatedly send the first physical channel. In this case, the bitmap may be 10010000000000000000000. The first time unit and the fourth time unit, that is, resources for sending the first physical channel, are shown by a grid-filled part in the figure.

Figure 4C:
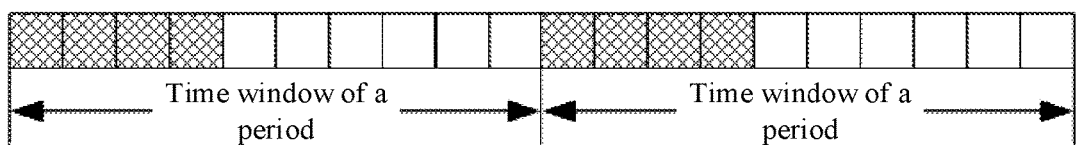
FIG. 4C is a schematic diagram of a repetition period configuration applicable to a communication method according to still another embodiment of this application.

FIG. 4C is a schematic diagram of a repetition period configuration applicable to a communication method according to still another embodiment of this application. Referring to FIG. 4C, the repetition period of the time window is 20 time units, and a first time unit to a fourth time unit are used to repeatedly send the first physical channel. In this case, the bitmap may be 11110000000000000000000. The first time unit to the fourth time unit, that is, resources for sending the first physical channel, are shown by a grid-filled part in the figure.

It can be learned from FIG. 4C that the resources used to repeatedly send the first physical channel may be consecutive resources in time domain, so that a transmission time latency can be reduced. It can be learned from FIG. 4A and FIG. 4B that the resources used to repeatedly send the first physical channel may be discrete resources in time domain, so that time diversity can be implemented, and transmission reliability can be improved.

It should be noted that, in the foregoing embodiment, coded bit sequences obtained by performing channel coding on first physical channels sent in the repetition period may be the same or may be different. In other words, redundancy versions of channel coding of the first physical channels may be the same or different. The redundancy version may be predefined. Referring to FIG. 4C, in the first time unit to the fourth time unit in a time window, redundancy versions of channel coding of the first physical channels may be 0, 2, 3, and 1 respectively; and in the first time unit to the fourth time unit in another time window, redundancy versions of channel coding of the first physical channels may be 1, 1, 2, and 2 respectively.

In addition, it should be further noted that, in each time window, the redundancy version may be predefined and derived from the resource used by the first physical channel. For example, the redundancy version is derived from a slot index, a symbol index, or an RB index used by the first physical channel. For example, assuming that there are P time units used to repeatedly send the first physical channel in a time window, that is, in one period, and a time unit index is K, redundancy versions used by the first physical channel are (k+offset) mod Q, where k=0, 1, . . . , P−1, the offset is an offset value, and Q is a quantity of redundancy versions of channel coding, may be 0, 1, . . . , P−1, and may be predefined or configured by using higher layer signaling.

In the foregoing embodiment, the network device sends the first physical channel to the user equipment based on the repetition period configuration of the first physical channel. A same redundancy version may be used for all first physical channels in the time window of the repetition period configuration, so that a time-domain, frequency-domain, or space-domain diversity feature of each first physical channel in each time unit can be effectively used, thereby further improving transmission reliability. In addition, different redundancy versions are used in different time units in the time window of the repetition period configuration, so that a channel coding gain can be used to improve transmission reliability.

In the foregoing embodiment, the network device sends the first physical channel to the user equipment on the resources of one or more candidate physical channels, and the first physical channel monitors the resources of the one or more candidate physical channels in the candidate physical channel set, to receive, on the resources of the one or more candidate physical channels, the first physical channel sent by the network device. To indicate the user equipment to perform blind detection, before sending the first physical channel to the user equipment on the resources of the one or more candidate physical channels, the network device further sends first configuration information to the user equipment. Correspondingly, the user equipment receives the first configuration information, where the first configuration information is used to indicate the user equipment to monitor the one or more candidate physical channels in the candidate physical channel set.

It should be noted that the method in this application is described in detail in the foregoing embodiments by using an example in which the payload of the first physical channel sent by the network device to the user equipment each time includes first information, that is, first information used to indicate an acknowledgment resource. However, this embodiment of this application is not limited thereto. In another possible implementation, the network device sends a second physical channel to the user equipment, where the second physical channel includes a transport block but does not include the first information. In this case, before sending the second control channel to the user equipment, the network device further sends second configuration information to the user equipment. Correspondingly, the user equipment receives the second configuration information, where the second configuration information is used to indicate the user equipment to detect the second physical channel, and an acknowledgment resource corresponding to the second physical channel is notified by using higher layer signaling or downlink control information.

It should be noted that a base station may separately configure and send the first/second configuration information, or may simultaneously configure and send the first/second configuration information. However, the first physical channel and the second physical channel do not occupy a same physical resource. Typically, the first physical channel and the second physical channel respectively occupy different time units, for example, respectively occupy different slots. For example, the base station indicates, by using the first configuration information, that a time unit set in which the candidate physical channel of the first physical channel is sent is A={s1, s2, $s_M$}, where M is a positive integer, and the base station indicates, by using the second configuration information, that a time unit set in which the second physical channel is sent is B={t1, t2, $t_N$}, where N is a positive integer. An intersection set of A and B is an empty set.

In the foregoing embodiment, the network device may indicate, based on the first configuration information and/or the second configuration information, the user equipment to detect the first physical channel and/or the second physical channel, where a payload of the first physical channel includes a transport block and control information, and the payload of the second physical channel includes the transport block, and the acknowledgment resource corresponding to the second physical channel is notified by using the higher layer signaling or the downlink control information. During specific implementation, the network device may choose, based on an actual service status, to deliver the first configuration information and/or the second configuration information to the user equipment, to flexibly meet requirements of different services on performance such as a throughput, reliability, and a latency. Particularly, when both the first configuration information and the second configuration information are configured, the acknowledgment resource corresponding to the second configuration information is notified by using the higher layer signaling or the downlink control information, and the user equipment always sends an ACK or a NACK on the acknowledgment resource, so that the network device measures a channel by using a sent signal, to help improve sending and receiving performance of the channel configured by using the first configuration information.

Figure 5:
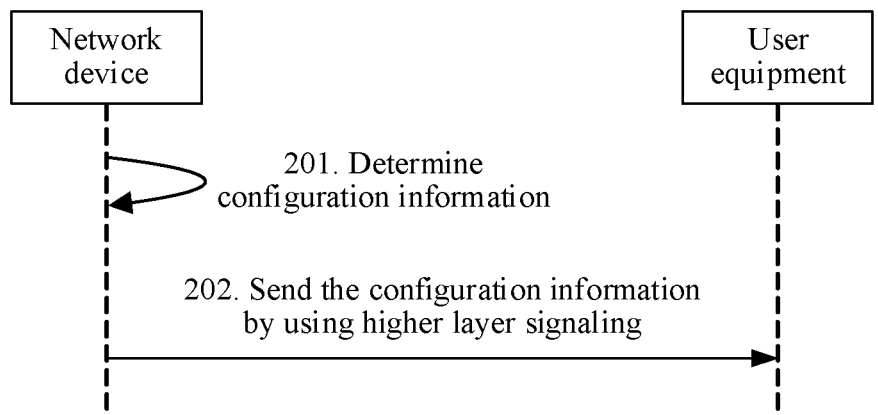
FIG. 5 is a schematic diagram of sending and reception of higher layer signaling that is applicable to a communication method according to an embodiment of this application.

It should be noted that, in this embodiment of this application, configuration information of a candidate physical channel set (that is, information related to a configuration of the candidate physical channel set), repetition quantity configuration information of the first physical channel, the first configuration information, the second configuration information, repetition period configuration information of the first physical channel (that is, information related to a repetition period configuration of the first physical channel), and the like may be preconfigured or configured by using the higher layer signaling. Specifically, FIG. 5 is a schematic diagram of sending and reception of higher layer signaling that is applicable to a communication method according to an embodiment of this application, and the following operations are included.

201. The network device determines configuration information.

202. The network device sends the configuration information to the user equipment by using higher layer signaling.

Specifically, when the configuration information is configured by using the higher layer, the network device determines the configuration information and sends the configuration information to the user equipment by using the higher layer signaling. Correspondingly, the user equipment receives the higher layer signaling, and the higher layer signaling may include configuration information of a candidate physical channel set (that is, information related to a configuration of the candidate physical channel set), repetition quantity configuration information of a first physical channel, first configuration information, second configuration information, repetition period configuration information of the first physical channel (that is, information related to a repetition period configuration of the first physical channel), and the like. The higher layer signaling includes, but is not limited to, an RRC IE, a MAC CE, and a combination thereof (for example, the RRC IE configures information about the candidate physical channel set, and the MAC CE further defines specific selection information).

Figure 6:
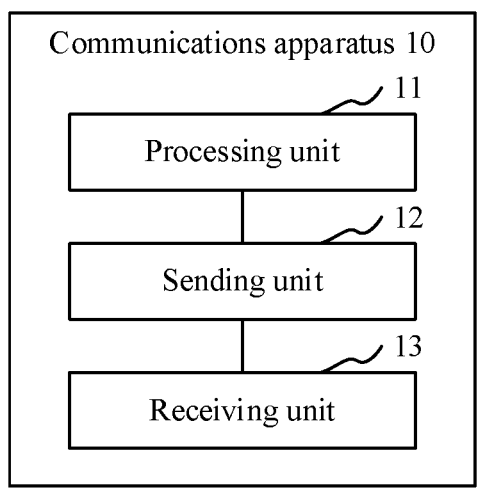
FIG. 6 is a schematic structural diagram of a communications apparatus according to an embodiment of this application.

FIG. 6 is a schematic structural diagram of a communications apparatus according to an embodiment of this application. The communications apparatus in this embodiment may be the foregoing network device, or may be a chip used in the network device. The communications apparatus may be configured to perform the actions of the network device in the foregoing method embodiment. As shown in FIG. 6, the communications apparatus 10 may include a processing unit 11, a sending unit 12, and a receiving unit 13.

The processing unit 11 is configured to determine one or more candidate physical channels from a candidate physical channel set.

The sending unit 12 is configured to send a first physical channel to user equipment on resources of the one or more candidate physical channels, where a payload of the first physical channel includes control information and a transport block, the control information includes first information, the first information is used to indicate an acknowledgment resource to the user equipment, and the acknowledgment resource is a resource used by the user equipment to send acknowledgment information to a network device.

The receiving unit 13 is configured to receive, on the acknowledgment resource, the acknowledgment information sent by the user equipment.

In one embodiment, the payload of the first physical channel further includes cyclic redundancy check CRC information of the control information and the transport block.

In one embodiment, the acknowledgment information is used to indicate that the user equipment correctly receives the payload; or the acknowledgment information is used to indicate that the user equipment correctly receives the transport block.

In one embodiment, the processing unit 11 is specifically configured to determine the one or more candidate physical channels based on a configuration of the candidate physical channel set, where the configuration of the candidate physical channel set includes one or more sizes of the one or more candidate physical channels in the candidate physical channel set and a quantity of the candidate physical channels in the candidate physical channel set.

In one embodiment, the processing unit 11 is specifically configured to determine the one or more candidate physical channels based on a format of the payload and the configuration of the candidate physical channel set, where the format of the payload is predefined or configured by a higher layer.

In one embodiment, the control information further includes: an identifier of a process of a process used for sending the transport block, and/or power control information of an uplink physical channel of the user equipment.

In one embodiment, the processing unit 11 is specifically configured to obtain the one or more candidate physical channels from the candidate physical channel set based on repetition quantity configuration information of the first physical channel, where the plurality of candidate physical channels form a candidate physical channel combination, at least two candidate physical channels in the candidate physical channel combination occupy different time units, the repetition quantity configuration information of the first physical channel indicates a set of repetition quantities of the first physical channel, payloads of all the candidate physical channels in the candidate physical channel combination are the same, and a configuration of the candidate physical channel combination is predefined or configured by a higher layer.

In one embodiment, the control information further includes second information, the second information indicates a repetition quantity value of the first physical channel, where the repetition quantity value belongs to the set of repetition quantities indicated by the repetition quantity configuration information of the first physical channel.

In one embodiment, the sending unit 12 is further configured to send first configuration information to the user equipment, where the first configuration information is used to indicate the user equipment to monitor the one or more candidate physical channels in the candidate physical channel set; and/or the sending unit 12 is further configured to send second configuration information to the user equipment, where the second configuration information is used to indicate the user equipment to detect a second physical channel, a payload of the second physical channel includes a transport block, and an acknowledgment resource corresponding to the second physical channel is notified by using higher layer signaling or downlink control information.

The communications apparatus provided in this embodiment of this application may perform the actions of the network device in the foregoing method embodiment. An implementation principle and a technical effect of the communications apparatus are similar to those in the method embodiment. Details are not described herein again.

Figure 7:
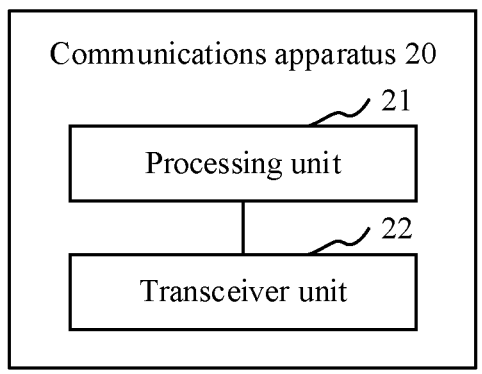
FIG. 7 is a schematic structural diagram of a communications apparatus according to another embodiment of this application.

FIG. 7 is a schematic structural diagram of a communications apparatus according to another embodiment of this application. The communications apparatus in this embodiment may be the foregoing user equipment, or may be a chip used in the user equipment. The communications apparatus may be configured to perform the actions of the user equipment in the foregoing method embodiment. As shown in FIG. 7, the communications apparatus 20 may include a processing unit 21 and a transceiver unit 22.

The processing unit 21 is configured to monitor one or more candidate physical channels in a candidate physical channel set, to receive, on resources of the one or more candidate physical channels, a first physical channel sent by a network device, where a payload of the first physical channel includes control information and a transport block, the control information includes first information, the first information is used to indicate an acknowledgment resource to user equipment, and the acknowledgment resource is a resource used by the user equipment to send acknowledgment information to the network device.

The transceiver unit 22 is configured to send the acknowledgment information to the network device on the acknowledgment resource.

In one embodiment, the payload of the first physical channel further includes cyclic redundancy check CRC information of the control information and the transport block.

In one embodiment, the acknowledgment information is used to indicate, to the network device, that the user equipment correctly receives the payload; or the acknowledgment information is used to indicate, to the network device, that the user equipment correctly receives the transport block.

In one embodiment, the processing unit 21 is specifically configured to monitor the one or more candidate physical channels in the candidate physical channel set based on a configuration of the candidate physical channel set, to receive the first physical channel sent by the network device, where the configuration of the candidate physical channel set includes one or more sizes of the one or more candidate physical channels in the candidate physical channel set and a quantity of the candidate physical channels in the candidate physical channel set.

In one embodiment, the processing unit 21 is specifically configured to monitor the one or more candidate physical channels based on a format of the payload and the configuration of the candidate physical channel set, where the format of the payload is predefined or configured by a higher layer.

In one embodiment, the control information further includes: an identifier of a process for receiving the transport block, and/or power control information of an uplink physical channel of the user equipment.

In one embodiment, the processing unit is specifically configured to monitor, in at least two different time units based on repetition quantity configuration information of the first physical channel, a candidate physical channel combination in the candidate physical channel set, to receive the first physical channel sent by the network device, where the repetition quantity configuration information of the first physical channel indicates a set of repetition quantities of the first physical channel, payloads of all candidate physical channels in the candidate physical channel combination are the same, at least two candidate physical channels in the candidate physical channel combination occupy different time units, and a configuration of the candidate physical channel combination is predefined or configured by a higher layer.

In one embodiment, the control information further includes second information, the second information indicates a repetition quantity value of the first physical channel, where the repetition quantity value belongs to the set of repetition quantities indicated by the repetition quantity configuration information of the first physical channel.

In one embodiment, the transceiver unit is further configured to: receive first configuration information sent by the network device, and monitor the one or more candidate physical channels in the candidate physical channel set based on the first configuration information; and/or the transceiver unit is further configured to: receive second configuration information sent by the network device, and detect a second physical channel based on the second configuration information, where a payload of the second physical channel includes a transport block, and an acknowledgment resource corresponding to the second physical channel is notified by using higher layer signaling or downlink control information.

The communications apparatus provided in this embodiment of this application may perform the actions of the user equipment in the foregoing method embodiment. An implementation principle and a technical effect of the communications apparatus are similar to those in the method embodiment. Details are not described herein again.

It should be noted that, it should be understood that the receiving unit may be a receiver in actual implementation, and the sending unit may be a transmitter in actual implementation. The processing unit may be implemented in a form of software invoked by a processing element, or may also be implemented in a form of hardware. For example, the processing unit may be a separately disposed processing element, or may be integrated into a chip of the foregoing apparatus for implementation. In addition, the processing unit may be stored in a memory of the foregoing apparatus in a form of program code, and invoked by a processing element of the foregoing apparatus to perform a function of the processing unit. In addition, all or some of the units may be integrated together, or may be implemented independently. The processing element may be an integrated circuit with a signal processing capability. In an implementation process, operations in the method or the units can be implemented by using a hardware integrated logical circuit in the processing element, or by using instructions in a form of software.

For example, the foregoing units may be one or more integrated circuits configured to implement the foregoing method, for example, one or more application-specific integrated circuits (ASIC), one or more microprocessors (DSP), or one or more field programmable gate arrays (FPGA). For another example, when one of the foregoing units is implemented by scheduling program code by a processing element, the processing element may be a general-purpose processor, for example, a central processing unit (CPU) or another processor that can invoke the program code. For another example, the units may be integrated together and implemented in a form of a system-on-a-chip (SOC).

Figure 8:
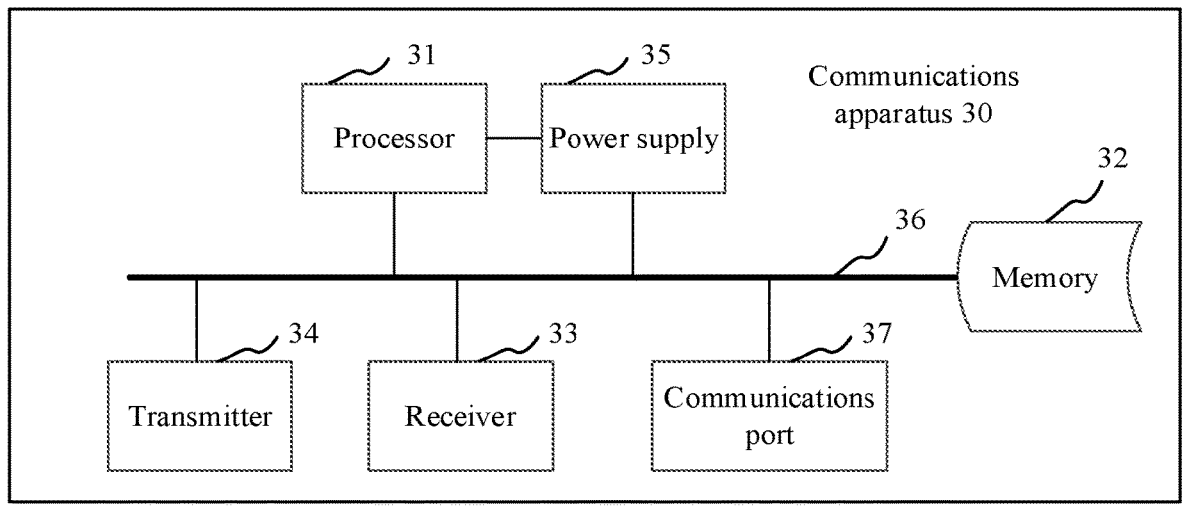
FIG. 8 is a schematic structural diagram of a communications apparatus according to still another embodiment of this application.

FIG. 8 is a schematic structural diagram of a communications apparatus according to still another embodiment of this application. As shown in FIG. 7, the communications apparatus 30 may include a processor 31 (for example, a CPU), a memory 32, a receiver 33, and a transmitter 34. The receiver 33 and the transmitter 34 are coupled to the processor 31, the processor 31 controls a receiving action of the receiver 33, and the processor 31 controls a sending action of the transmitter 34. The memory 32 may include a high-speed random access memory (RAM), and may further include a non-volatile memory (NVM), for example, at least one magnetic disk storage. The memory 32 may store various instructions, to complete various processing functions and implement method operations in this application. In one embodiment, the communications apparatus in this application may further include a power supply 35, a communications bus 36, and a communications port 37. The receiver 33 and the transmitter 34 may be integrated into a transceiver of the communications apparatus, or may be independent transceiver antennas on the communications apparatus. The communications bus 36 is configured to implement communication connection between components. The communications port 37 is configured to implement connection and communication between the communications apparatus and another peripheral.

In this embodiment of this application, the memory 32 is configured to store computer-executable program code, and the program code includes an instruction. When the processor 31 executes the instruction, by using the instruction, the processor 31 of the communications apparatus is enabled to perform a processing action of the network device in the foregoing method embodiment, the receiver 33 is enabled to perform a receiving action of the network device in the foregoing method embodiment, and the transmitter 34 is enabled to perform a sending action of the network device in the foregoing method embodiment. Implementation principles and technical effects thereof are similar. Details are not described herein again.

Figure 9:
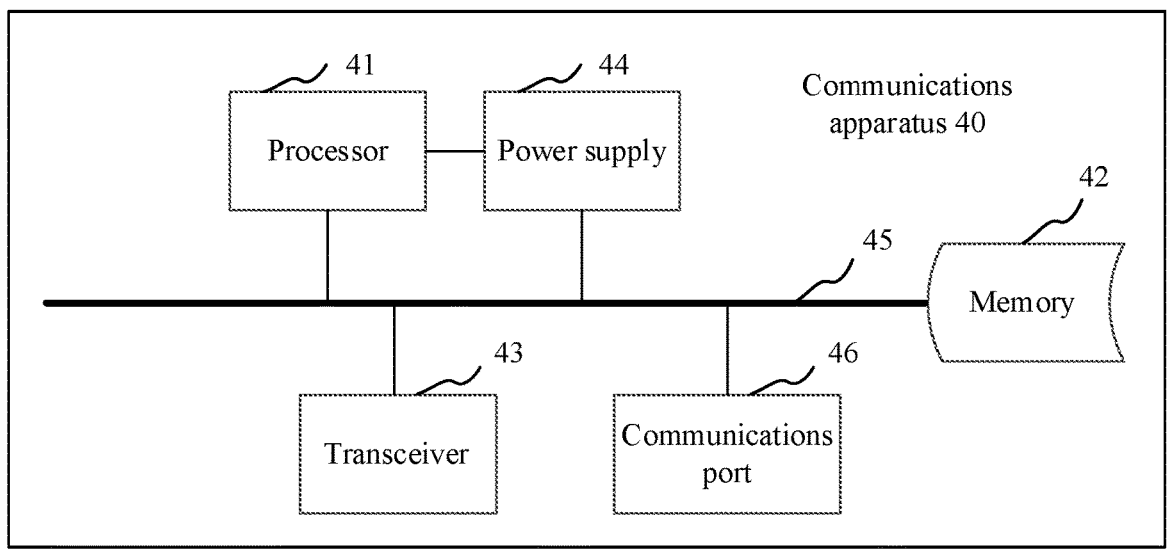
FIG. 9 is a schematic structural diagram of another communications apparatus according to an embodiment of this application.

FIG. 9 is a schematic structural diagram of another communications apparatus according to an embodiment of this application. As shown in FIG. 8, the communications apparatus may include a processor 41 (for example, a CPU), a memory 42, and a transceiver 43. The transceiver 43 is coupled to the processor 41. The processor 41 controls an action of the transceiver 43. The memory 42 may include a high-speed random access memory (RAM), and may further include a non-volatile memory (NVM), for example, at least one magnetic disk storage. The memory 42 may store various instructions, to complete various processing functions and implement method operations in this application. In one embodiment, the communications apparatus in this application may further include a power supply 44, a communications bus 45, and a communications port 46. The communications bus 45 is configured to implement communication connection between components. The communications port 46 is configured to implement connection and communication between the communications apparatus and another peripheral.

In this embodiment of this application, the memory 42 is configured to store computer-executable program code, and the program code includes an instruction. When the processor 41 executes the instruction, by using the instruction, the processor 41 of the communications apparatus is enabled to perform an action of the user equipment in the foregoing method embodiment, and the transceiver 43 is enabled to perform sending and receiving actions of the user equipment in the foregoing method embodiment. Implementation principles and technical effects thereof are similar. Details are not described herein again.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded or executed on a computer, the procedures or functions according to the embodiments of this application are completely or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (SSD)), or the like.

"A plurality of" in this application refers to two or more than two. The term "and/or" in this specification describes only an association relationship for describing associated objects and represents that three relationships may exist. For example, A and/or B may represent the following three cases: Only A exists, both A and B exist, and only B exists. In addition, the description "at least one of . . . " in this specification indicates one of listed items or any combination thereof. For example, "at least one of A, B, and C" may indicate the following six cases: Only A exists, only B exists, only C exists, both A and B exist, both B and C exist, both A and C exist, and A, B, and C all exist. In addition, the character "/" in this specification generally indicates an "or" relationship between the associated objects. In the formula, the character "/" indicates a "division" relationship between the associated objects.

It may be understood that numerical symbols used in the embodiments of this application are differentiated merely for ease of description, but are not used to limit the scope of the embodiments of this application.

It may be understood that sequence numbers of the foregoing processes do not mean execution sequences in the embodiments of this application. The execution sequences of the processes should be determined based on functions and internal logic of the processes, and shall not constitute any limitation on implementation processes of the embodiments of this application.

What is claimed is:

1. A communication method, comprising:
monitoring one or more candidate physical channels in a set of candidate physical channels, to receive, on resources of the one or more candidate physical channels, a payload on a first physical channel from a network device, wherein the payload on the first physical channel comprises control information and a transport block, wherein the control information is to indicate a resource of an acknowledgment for the payload on the first physical channel transmitted by the network device to a user equipment, and wherein the resource of the acknowledgment is a resource to be used by the user equipment to send acknowledgment information to the network device; and sending the acknowledgment information to the network device on the resource of the acknowledgment indicated in the control information.

2. The method according to claim 1, wherein the payload on the first physical channel further comprises cyclic redundancy check (CRC) information of the control information and the transport block.

3. The method according to claim 1, wherein the acknowledgment information is to indicate, to the network device, that the user equipment correctly receives the payload; or the acknowledgment information is to indicate, to the network device, that the user equipment correctly receives the transport block.

4. The method according to claim 1, wherein the monitoring one or more candidate physical channels in the set of candidate physical channels, to receive a first physical channel from a network device comprises:

monitoring the one or more candidate physical channels in the set of candidate physical channels based on a configuration of the set of candidate physical channels, to receive the payload on the first physical channel from the network device, wherein the configuration of the set of candidate physical channels Get comprises one or more sizes of the one or more candidate physical channels in the set of candidate physical channels and a quantity of the candidate physical channels in the set of candidate physical channels.

5. The method according to claim 1, wherein the control information further comprises at least one of an identifier of a process for receiving the transport block, or power control information of an uplink physical channel of the user equipment.

6. The method according to claim 1, wherein the monitoring one or more candidate physical channels in the set of candidate physical channels, to receive the first physical channel from a network device comprises:

monitoring, in at least two different time units based on repetition quantity configuration information of the first physical channel, a candidate physical channel combination in the set of candidate physical channels, to receive the payload on the first physical channel from the network device, wherein the repetition quantity configuration information of the first physical channel indicates a set of repetition quantities of the first physical channel, wherein payloads of all candidate physical channels in the candidate physical channel combination are the same, wherein at least two candidate physical channels in the candidate physical channel combination occupy different time units, and wherein a configuration of the candidate physical channel combination is predefined or configured by a higher layer.

7. The method according to claim 1, further comprising: receiving first configuration information from the network device, and monitoring the one or more candidate physical channels in the set of candidate physical channels based on the first configuration information; and/or receiving second configuration information from the network device, and detecting a payload on a second physical channel based on the second configuration information, wherein the payload on the second physical channel comprises a transport block, and wherein a resource of an acknowledgment corresponding to the second physical channel is notified by higher layer signaling or downlink control information.

8. A communications apparatus, comprising:

a non-transitory memory storage comprising instructions; and one or more processors in communication with the memory storage, wherein the instructions, when executed by the one or more processors, cause the apparatus to:

determine one or more candidate physical channels in a set of candidate physical channels;

send a payload on a first physical channel to a user equipment on resources of the one or more candidate physical channels, wherein the payload on the first physical channel comprises control information and a transport block, wherein the control information is to indicate a resource of an acknowledgment for the payload on the first physical channel transmitted by the network device to the user equipment, and wherein the resource of the acknowledgment is a resource to be used by the user equipment to send acknowledgment information to a network device; and receive, on the resource of the acknowledgment, the acknowledgment information indicated in the control information from the user equipment.

9. The apparatus according to claim 8, wherein the payload of the first physical channel further comprises cyclic redundancy check (CRC) information of the control information and the transport block.

10. The apparatus according to claim 8, wherein the acknowledgment information is to indicate that the user equipment correctly receives the payload; or the acknowledgment information is to indicate that the user equipment correctly receives the transport block.

11. The apparatus according to claim 8, wherein the instructions, when executed by the one or more processors, cause the apparatus to:

determine the one or more candidate physical channels based on a configuration of the set of candidate physical channels, wherein the configuration of the set of candidate physical channels comprises one or more sizes of the one or more candidate physical channels in the set of candidate physical channels and a quantity of the candidate physical channels in the set of candidate physical channels.

12. The apparatus according to claim 8, wherein the control information further comprises at least one of an identifier of a process for sending the transport block, or power control information of an uplink physical channel of the user equipment.

13. The apparatus according to claim 8, wherein the instructions, when executed by the one or more processors, cause the apparatus to:

obtain the one or more candidate physical channels from the set of candidate physical channels based on repetition quantity configuration information of the first physical channel, wherein a plurality of candidate physical channels form a candidate physical channel combination, wherein at least two candidate physical channels in the candidate physical channel combination occupy different time units, wherein the repetition quantity configuration information of the first physical channel indicates a set of repetition quantities of the first physical channel, wherein payloads of all the candidate physical channels in the candidate physical channel combination are the same, and wherein a configuration of the candidate physical channel combination is predefined or configured by a higher layer.

14. A communications apparatus, comprising:

a non-transitory memory storage comprising instructions; and one or more processors in communication with the memory storage, wherein the instructions, when executed by the one or more processors, cause the apparatus to:

monitor one or more candidate physical channels in a set of candidate physical channels, to receive, on resources of the one or more candidate physical channels, a payload on a first physical channel from a network device, wherein the payload on the first physical channel comprises control information and a transport block, wherein the control information is to indicate a resource of an acknowledgment for the payload on the first physical channel transmitted by the network device to a user equipment, and wherein the resource of the acknowledgment is a resource to be used by the user equipment to send acknowledgment information to the network device; and send the acknowledgment information to the network device on the resource of the acknowledgment indicated in the control information.

15. The apparatus according to claim 14, wherein the payload of the first physical channel further comprises cyclic redundancy check (CRC) information of the control information and the transport block.

16. The apparatus according to claim 14, wherein the acknowledgment information is to indicate, to the network device, that the user equipment correctly receives the payload; or the acknowledgment information is to indicate, to the network device, that the user equipment correctly receives the transport block.

17. The apparatus according to claim 14, wherein the instructions, when executed by the one or more processors, cause the apparatus to:

monitor the one or more candidate physical channels in the set of candidate physical channels based on a configuration of the set of candidate physical channels, to receive the payload on the first physical channel from the network device, wherein the configuration of the set of candidate physical channels comprises one or more sizes of the one or more candidate physical channels in the set of candidate physical channels and a quantity of the candidate physical channels in the set of candidate physical channels.

18. The apparatus according to claim 14, wherein the control information further comprises at least one of an identifier of a process for receiving the transport block, or power control information of an uplink physical channel of the user equipment.

19. The apparatus according to claim 14, wherein the instructions, when executed by the one or more processors, cause the apparatus to:

monitor, in at least two different time units based on repetition quantity configuration information of the first physical channel, a candidate physical channel combination in the set of candidate physical channels, to receive the payload on first physical channel from the network device, wherein the repetition quantity configuration information of the first physical channel indicates a set of repetition quantities of the first physical channel, wherein payloads of all candidate physical channels in the candidate physical channel combination are the same, wherein at least two candidate physical channels in the candidate physical channel combination occupy different time units, and wherein a configuration of the candidate physical channel combination is predefined or configured by a higher layer.

20. The apparatus according to claim 14, wherein the instructions, when executed by the one or more processors, further cause the apparatus to:

receive first configuration information from the network device, and monitor the one or more candidate physical channels in the set of candidate physical channels based on the first configuration information; and/or receive second configuration information from the network device, and detect a payload on a second physical channel based on the second configuration information, wherein the payload on the second physical channel comprises a transport block, and wherein a resource of an acknowledgment corresponding to the second physical channel is notified by higher layer signaling or downlink control information.

* * * * *